United States Patent [19]
Hagiwara

[11] Patent Number: 5,950,022
[45] Date of Patent: *Sep. 7, 1999

[54] FOCUS DETECTING DEVICE

[75] Inventor: Shinichi Hagiwara, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,903

[22] Filed: Jul. 8, 1997

[30] Foreign Application Priority Data

Jul. 10, 1996 [JP] Japan .................................... 8-198575

[51] Int. Cl.⁶ .................................................. G03B 13/36
[52] U.S. Cl. ......................................... 396/121; 396/103
[58] Field of Search ..................................... 396/103, 121

[56] References Cited

U.S. PATENT DOCUMENTS 5,659,814  8/1997  Matsukawa et al. ................... 396/121
5,692,222  11/1997  Yamada et al. ........................ 396/121

FOREIGN PATENT DOCUMENTS 60-12579   1/1985  Japan .
60-12765   1/1985  Japan .
60-103331  6/1985  Japan .

*Primary Examiner*—Russell Adams
*Attorney, Agent, or Firm*—Fitzpatrick, Cella, Harper & Scinto

[57] ABSTRACT

A focus detecting device which is of the kind having a plurality of focus detecting areas and detecting focus by selecting a desired area from among the focus detecting areas is arranged such that the desired focus detecting area is selected by operating an operation member to shift the selecting position from one area to another one by one in a first mode and at intervals of a plurality of areas in a second mode, so that the focus detecting area can be speedily selected.

8 Claims, 22 Drawing Sheets

FIG. 7(A)
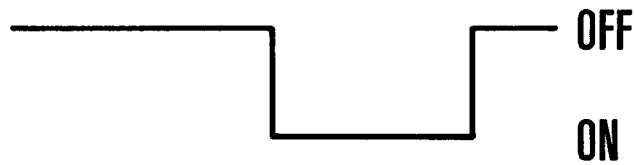
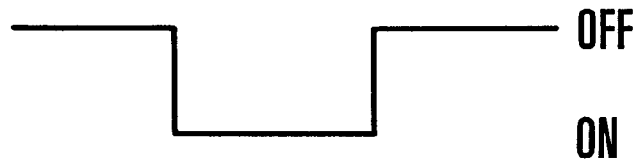
FIG. 7(B)
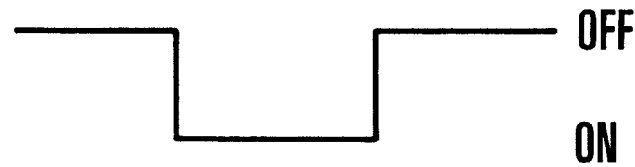
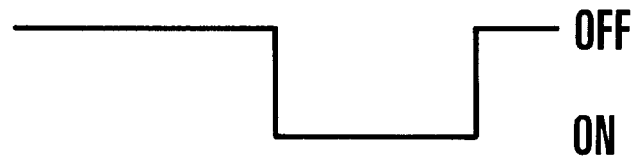

FOCUS DETECTING DEVICE

BACKGROUND OF THE INVENTION

1. Field of the Invention

This invention relates to an improvement on an optical apparatus, a focus detecting device and an automatic focusing type camera, having focus detecting means which is capable of detecting a state of focus of, for example, each of a plurality of focus detecting areas within an image plane independently of others.

2. Description of Related Art

The focus detecting device of a single-lens reflex camera was arranged in the beginning to permit focus detection only for the central part of a photo-taking image plane. Hence, focus on an object to be photographed must be detected in the central part of the image plane. In a case where a picture must be taken with a focusing object not located in the central part of the image plane, a photo-taking area must be first shifted to have the focusing object in the central part of the image plane and, after that, the photo-taking area must be shifted again to have the object in a desired position within a picture composition on the image plane.

This method, however, has presented various problems. One problem lies in that, it is difficult to seize a good shutter-operating opportunity for a moving object. Another problem lies in that, since the position of the focusing object at the time of actually taking a shot differs from the focus detecting area, the shot might be taken at an inapposite exposure control value.

To solve these problems, some of focus detecting devices are arranged these days to have a plurality of focus detecting areas provided within an image plane, each being arranged to be used independently of another for focus detection. The number of the focus detecting areas is six or thereabout at the most. Focus is adjusted on the basis of information of focus detection from one of these areas that is selected by operating an operation member or the like.

The focus detecting device of the above-stated kind includes a line sensor consisting of a plurality of photoelectric conversion elements for each of the focus detecting areas. The focus is detected by carrying out a computing operation on an image signal which is time-serially outputted from the line sensor as information on the luminance distribution of the object.

The conventional focus detecting device is briefly described below with reference to FIG. 21 which shows a focus detecting optical system of a phase difference type having five focus detecting areas.

The focus detecting device is composed of a field lens AFFL, a perforated field mask AFMSK, a secondary image forming lens AFDL, a stop plate AFDP and an AF area sensor device SNS which consists of a plurality of line sensor pairs.

The perforated field mask AFMSK is provided with slits AFMSK-1 to AFMSK-5 and is disposed in the neighborhood of an anticipated image forming plane of a photo-taking objective lens which is not shown. Each of these slits AFMSK-1 to AFMSK-5 is arranged to determine a distance measuring field. The stop plate AFDP is arranged to restrict a light flux incident on the lens AFDL and is disposed in a position where an image can be formed by the power of the field lens AFFL approximately at the position of the exit pupil of the photo-taking objective lens.

The secondary image forming lens AFDL consists of four pairs of positive lenses. In the lens AFDL, a pair of positive lenses AFDL-1A and AFDL-1B are arranged to cause a part of an object image defined by the mask slit AFMSK-1 to be formed again approximately on a pair of line sensors SNS-2A and SNS-2B. A part of the object image defined by the mask slit AFMSK-2 is formed again by a pair of positive lenses AFDL-1A and AFDL-1B approximately on a pair of line sensors SNS-1A and SNS-1B.

A part of the object image defined by the mask slit AFMSK-3 is split into two orthogonally intersecting light fluxes, which are projected respectively by a pair of positive lenses AFDL-3A and AFDL-3B and another pair of positive lenses AFDL-4A and AFDL-4B on a pair of line sensors SNS-3A and SNS-3B and another pair of line sensors SNS-4A and SNS-4B.

The output of each of the line sensors is read out as an electrical signal indicating a degree of luminance resulting from illumination. Then, a value representing the state of focus of the objective lens on the object detected from the distance measuring field defined by each mask slit is obtained by a computing operation on the electrical signal.

Further, for an image plane FIARA shown in FIG. 22, the distance measuring field which is defined by the five mask slits can be set, for example, at positions AFP1 to AFP5, as shown in FIG. 22.

FIG. 22 shows the relation of the image plane FIARA to the focus detecting areas as seen by looking into the viewfinder of a camera. In FIG. 22, reference symbol FIMSK denotes a field mask which forms a field area of the viewfinder. The image plane FIARA represents a photo-taking area wherein an object to be photographed is observed through a lens mounted on the camera.

The photo-taking area FIARA have five focus detecting areas AFP1 to AFP5. One of the five focus detecting areas AFP1 to AFP5 is selected by the operator of the camera as desired. These focus detecting areas correspond to the line sensor pairs which form the AF (automatic focusing) area sensor device SNS of the image forming optical system shown in FIG. 21, as mentioned above. Reference symbol FDSP denotes an LCD which is arranged to display photo-taking information within the viewfinder.

The focus detecting device having a plurality of focus detecting areas naturally necessitates some means for selecting one of the focus detecting areas. The known focus detecting area selecting means has been arranged to operate in various manners including, for example, the following methods. In an automatic selecting method, an object located nearest is selected according to the focus state of each focus detecting area and the focus is adjusted for the object. In another method, the visual line of the operator looking into the viewfinder of the camera is detected and a focus detecting area located nearest to the visual line is selected. In a manual method, one of the focus detecting areas is selected as desired by manually operating an operation member.

Further, a device for setting photo-taking information by manually operating a rotary operation member of a camera is disclosed in Japanese Laid-Open Patent Application No. SHO 60-103331. According to the disclosure, a photo-taking information setting device for a camera is arranged to have different phases and increase or decrease a setting value by detecting the phases of two signals which are generated in response to a manual operation on a photo-taking information setting member. The device disclosed includes control means which is arranged to let the setting value vary only when the photo-taking information setting member is driven at least ½ of the period of the two signals. This control means effectively prevents a display of information from flickering even if the photo-taking information setting member is operated little by little, so that the operability of the camera can be enhanced.

Further, according to a further known method for setting photo-taking information by a dial rotating operation, a dial disposed on a flat surface of a back cover of the camera is rotated to vary, as desired, control information of varied kinds, such as an amount of exposure correction, a shutter time, an aperture value, etc., with the back cover in a closed state. The dial rotating operation is normally performed with a right hand thumb. Therefore, an operation on a shutter release button with an index finger to keep the button in a state of being pushed halfway and only to its first half stroke position can be carried out without difficulty.

To take advantage of this operation method, some of the cameras of the kind having digital signal input means on the side of a back cover are provided these days with a circuit which is arranged to receive a signal from the digital signal input means on the back cover and to process camera information such as an aperture value, a shutter time, etc., and a switching circuit arranged to automatically switch the camera information settable by the digital signal input means from one kind over to another according to whether the camera is in a state of supplying power in response to a release operation or in a standby state. The arrangement permits setting photo-taking information while the camera is in a state of being held with a finger applied to the shutter release button in the process of taking a shot, so that the operability of the camera can be enhanced by diversifying the functions of the digital signal input means on the side of the back cover. The arrangement also effectively prevents erroneous information setting.

Generally, a shutter operating opportunity of a camera passes in a moment. Therefore, a shutter release must be always kept in a ready state while keeping a desired object under continuous surveillance. Therefore, it is important that a focus adjusting (focusing) device is arranged to be capable of quickly carrying out focus adjustment by accurately selecting a focus detecting area even in the event of a quickly moving object.

In this respect, the conventional focus detecting device mentioned above is capable of easily selecting a focus detecting area even if it is arranged to switch the focus detecting area from one area over to another by one round of operation, because the number of the focus detecting areas is only six or thereabout.

However, in the case of a focus detecting device having numerous focus detecting areas consisting of area sensors, it is difficult to quickly switch one focus detecting area to another. Hence, there arises the problem of missing a shutter operating opportunity.

Further, in a case where a focusing object desired is very small, it is difficult to accurately select a focus detecting area where the tiny object is located.

BRIEF SUMMARY OF THE INVENTION

It is a principal object of the invention to provide an optical apparatus which is capable of speedily selecting an information detecting area, such as a focus detecting area.

To attain the above object, in accordance with an aspect of the invention, a focus detecting device which is of the kind having a plurality of focus detecting areas and detecting focus by selecting a desired area from among the plurality of focus detecting areas is arranged in such a manner that the desired focus detecting area is selected by operating an operation member to shift the selecting position from one area to another by every first number of areas in a first mode and by every second number of areas which is greater than the first number in a second mode, so that the focus detecting area can be speedily selected.

In another aspect of the invention, the focus detecting device is arranged such that the desired focus detecting area is selected by shifting the selecting position from one area to another by every first number of areas when a first operation member is operated and by every second number of areas which is greater than the first number when a second operation member is operated, so that the focus detecting area can be speedily selected.

The above and other objects, aspects and features of the invention will become apparent from the following detailed description of embodiments thereof taken in conjunction with the accompanying drawings.

BRIEF DESCRIPTION OF THE SEVERAL VIEWS OF THE DRAWING

FIGS. 7(A) and 7(B) are timing charts showing signal waveforms resulting from the operation of a dial switch shown in FIG. 6.

DETAILED DESCRIPTION OF THE INVENTION

Preferred embodiments of the invention will be described below in detail with reference to the drawings.
(First Embodiment)

Figure 1:
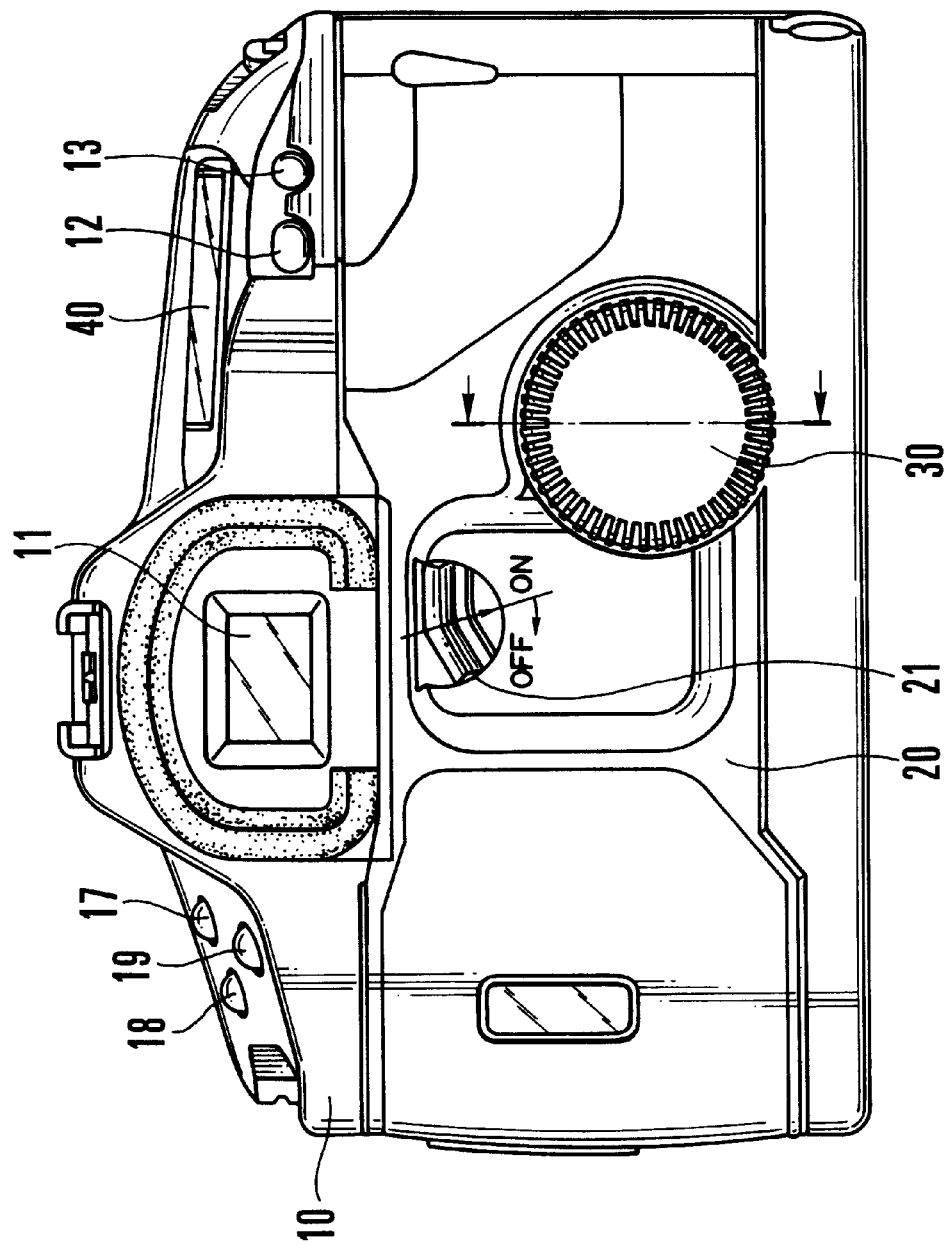
FIG. 1 is a rear view of a camera according to a first embodiment of the invention.
Figure 2:
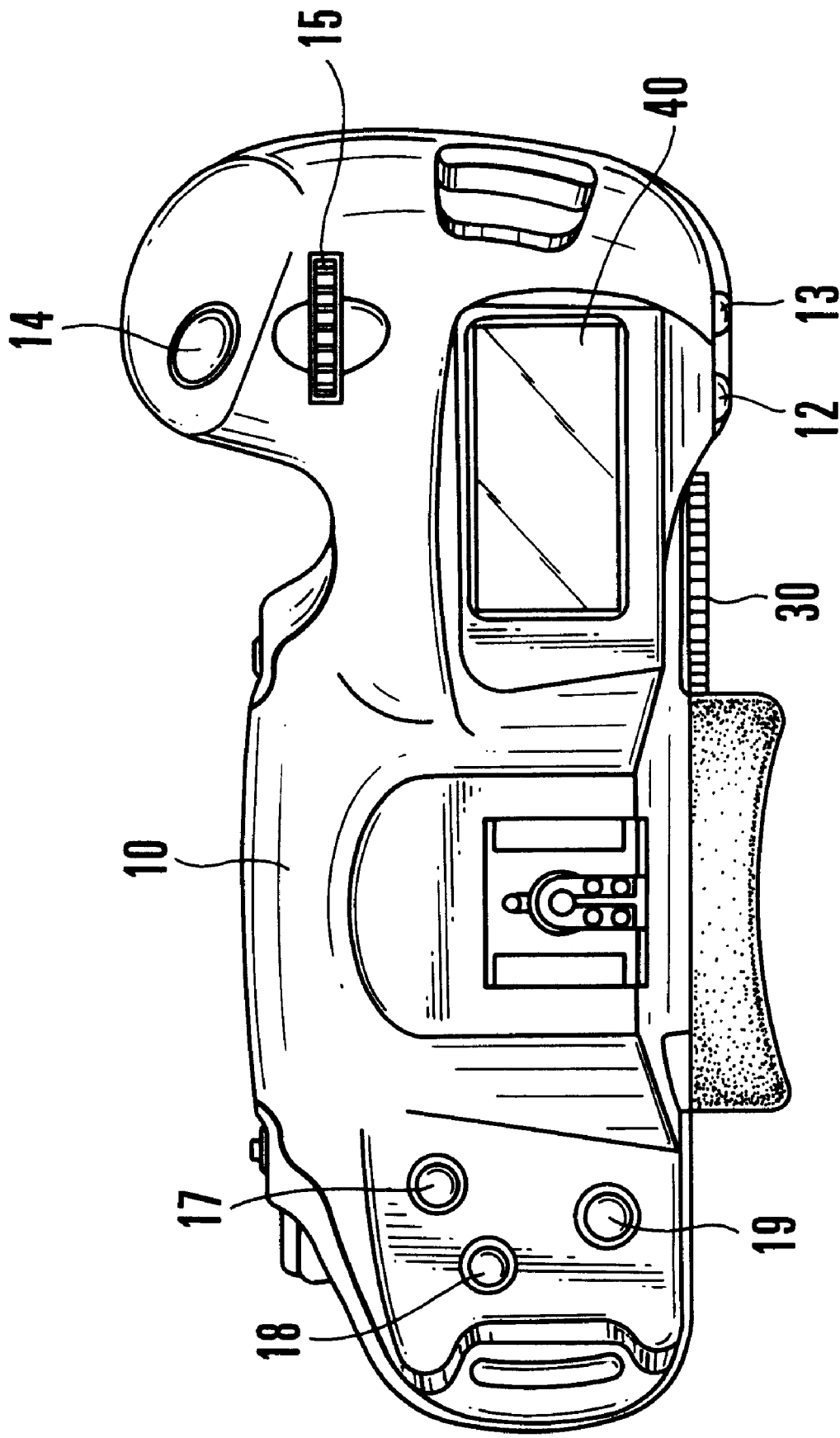
FIG. 2 is a top view of the camera of FIG. 1.

FIG. 1 is a rear view of a camera according to a first embodiment of the invention. FIG. 2 is a top view of the camera shown in FIG. 1.

Referring to FIGS. 1 and 2, there are illustrated a camera body 10, an eyepiece part 11 and an exposure compensation button 12 which is provided for selecting an amount of compensation of an exposure control value of the camera. A focus detecting area selection button 13 is provided for selecting one area from among different focus detecting areas which will be described later herein. An exposure control mode selection button 17 is provided for selecting one mode from among different exposure control modes. A focus mode selection button 18 is provided for focus detection. A light measuring mode selection button 19 is provided for selecting one of the light measuring modes.

In selecting one mode from among different modes such as the focus modes which include a one-shot mode, a servo mode, etc., a desired mode can be selected by pushing an associated one of the selection buttons 13, 17, 18 and 19 and, after that, by turning a dial 15 which is provided on the upper surface of the camera body 10.

In a case where both the exposure control mode selection button 17 and the light measuring mode selection button 19 are pushed, a mode of selecting an ISO film sensitivity value is obtained. With both the exposure control mode selection button 17 and the light measuring mode selection button 19 pushed, an ISO film sensitivity value can be selected by turning the dial 15 which is disposed on the supper surface of the camera body 10.

Reference numeral 14 denotes a shutter release button. The dial 15 is arranged to input information of varied kinds including digital information. A back cover 20 is provided with a dial 30 for inputting digital information to the camera and a dial lock switch 21 for inhibiting any input by the dial 30. The dial 30 and the dial lock switch 21 are disposed on a flat part of the back cover 20 (the back cover 20 hereinafter being called a dial back cover). A display part 40 is arranged to display the operation modes of the camera, etc., and to let the operator to know the details of information set in the camera.

Figure 3:
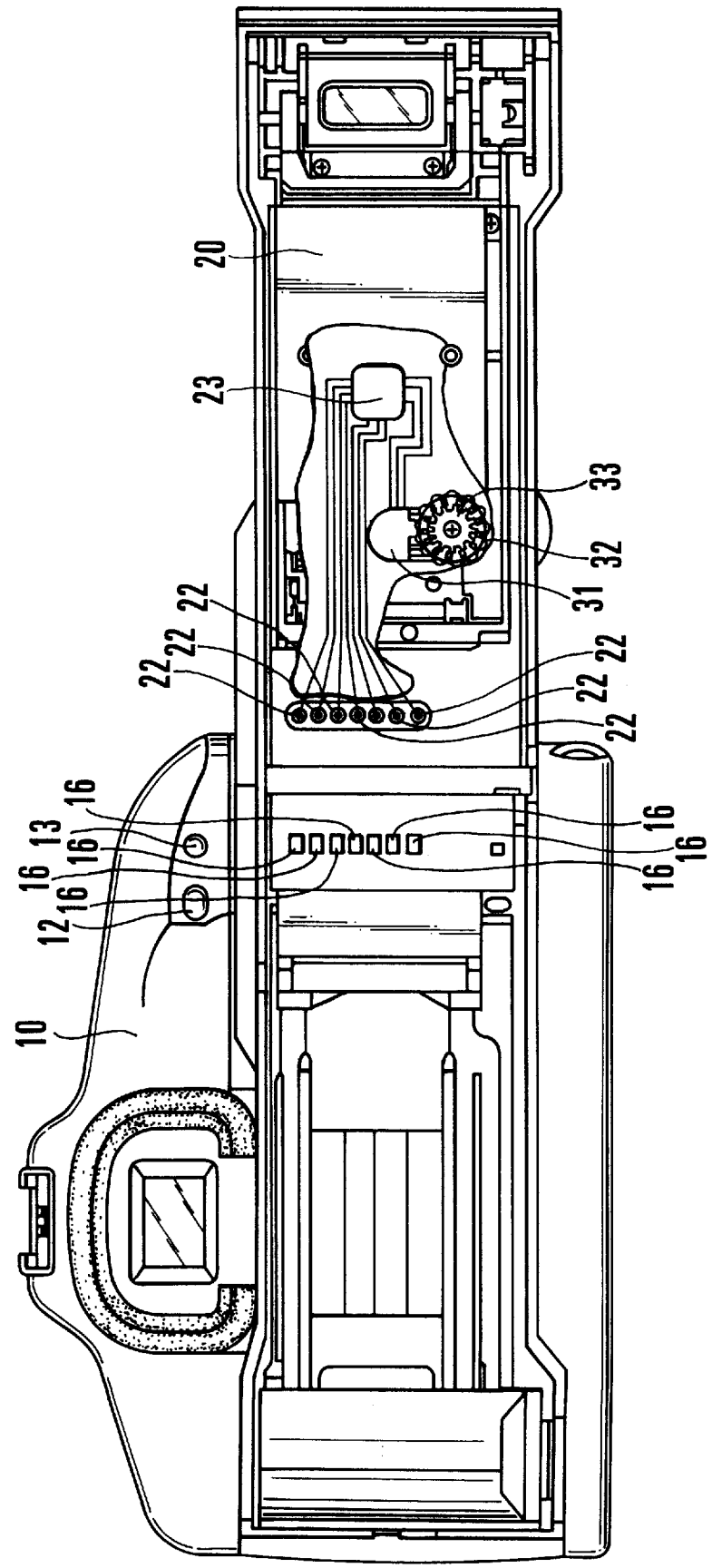
FIG. 3 is a rear view showing the camera of FIG. 1 in a state obtained when its back cover is opened.
Figure 6:
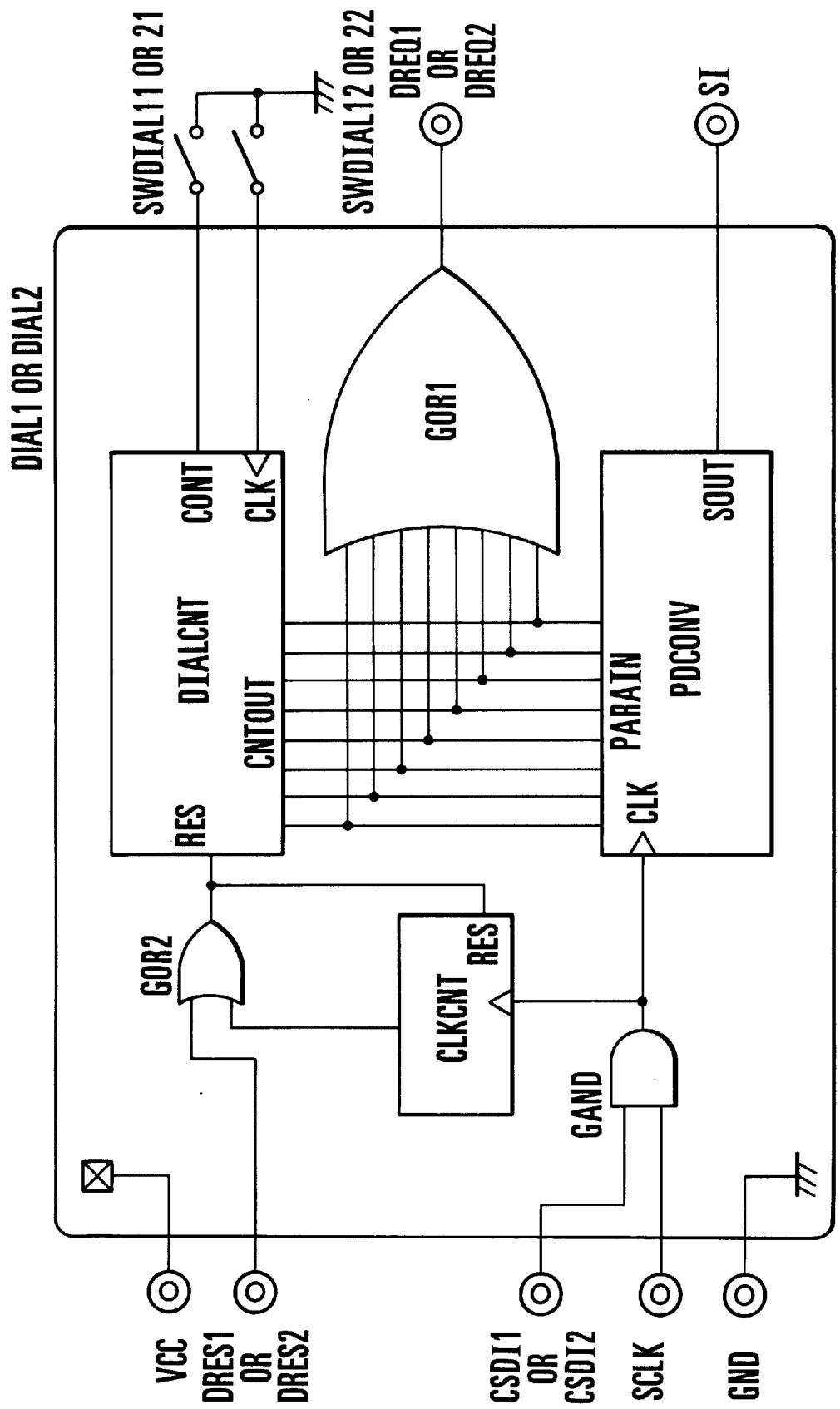
FIG. 6 is a block diagram showing the arrangement of an information input device which is shown in FIG. 5.

FIG. 3 is a rear view showing the inside of the dial back cover 20 of the camera. Referring to FIG. 3, the camera body 10 is provided with a group of contacts 16 which are arranged to be in contact with a group of input information transmitting contacts 22 disposed on the side of the dial back cover 20 with the dial back cover 20 in a closed state. Information signals are thus arranged to be transmitted through these contact groups 22 and 16 to a control circuit which is disposed within the camera body 10. A signal generation circuit 23 is disposed on the side of the dial back cover 20. The signal generating circuit 23 corresponds to an information input device DIAL2 which is shown in FIGS. 4 and 6 and is arranged to generate a pulse signal according to the rotation of the dial 30 and to supply the pulse signal to the control circuit which is disposed within the camera body 10.

Figure 4:
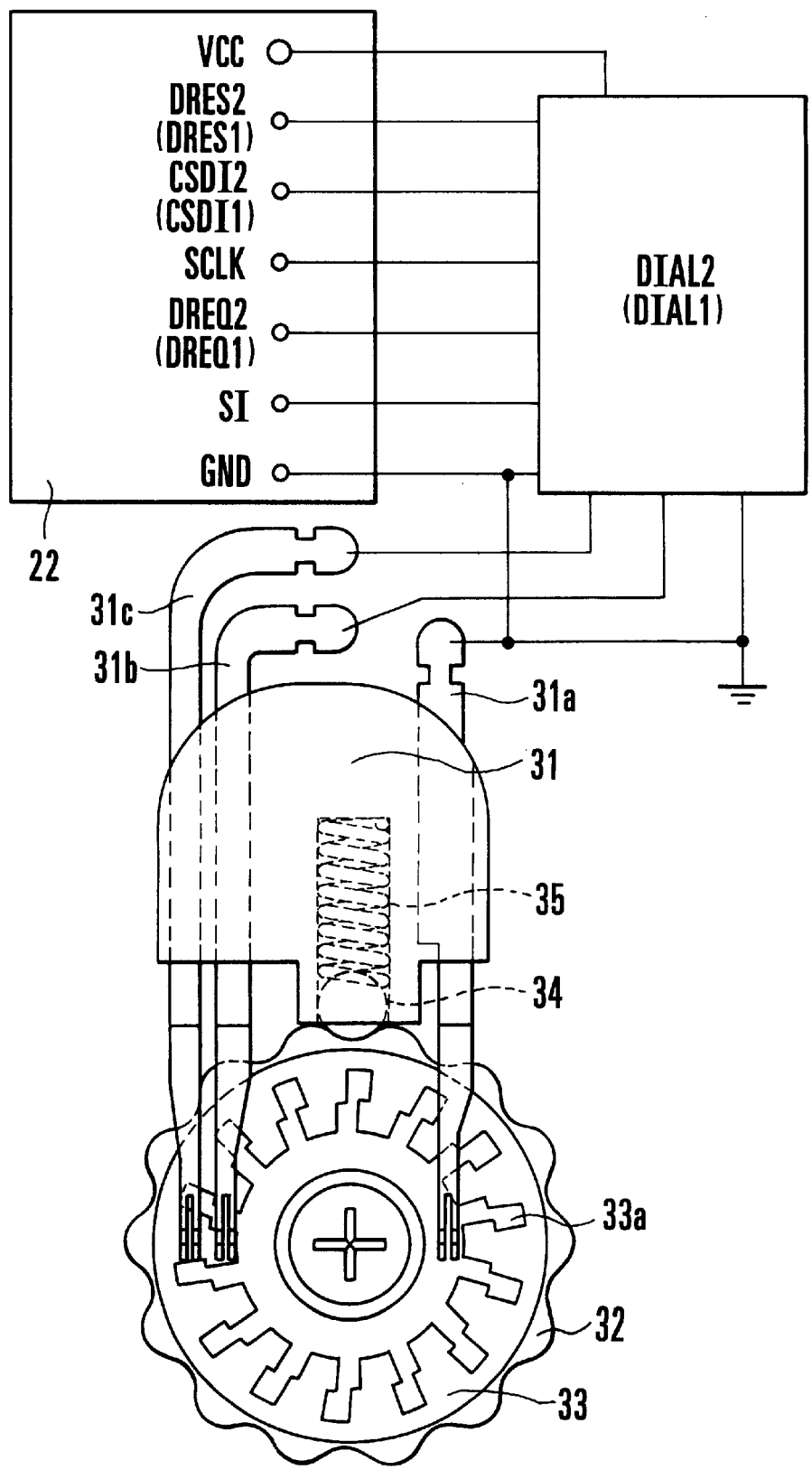
FIG. 4 is a plan view showing a dial pattern of the back cover shown in FIG. 3.

FIG. 4 is an enlarged view of the dial 30 which is disposed on the dial back cover 20 or the dial 15 which is disposed on the camera body 10. The two dials 30 and 15 are arranged in the same manner except for the arrangement of the contact group 22.

The dial 30 which is disposed on the dial back cover 20 is first described as follows.

Referring to FIG. 4, the dial contact piece 31 is secured to the inner side of the dial back cover 20 and is arranged to become conductive to output a signal by coming into contact with a pattern 33a on a dial circuit board 33, which rotates accordingly as the dial 30 rotates. The dial contact piece 31 has signal output terminals 31a to 31c.

A click plate 32 is arranged to rotate together with the dial 30. A ball 34 is urged and pushed by a spring 35 against a crest or root part or the click plate 32 in such a way as to impart evenly spaced clicks to the rotation of the dial 30.

The signal output terminals 31a to 31c are connected to the information input device DIAL2. The information input device DIAL2 is connected to the contact group 22 which is provided for transmitting input information. The contact group 22 is composed of a power supply contact VCC, a grounding contact GND and respective contacts for signals DRES2, CSDI2, SCLK, DREQ2 and SI.

The dial 15 which is provided on the camera body 10 is next described. In this case, the dial contact piece 31 is secured to the inside of the camera body 10. The contact group 22 is not provided. The information input device DIAL1 is connected to a control part of the camera body 10. A signal contact DRES1 corresponds to the signal contact DRES2 of the dial 30. A signal contact CSDI1 corresponds to the signal contact CSDI2. A signal contact DREQ1 corresponds to the signal contact DREQ2. With the exception of these points, the dial 15 is arranged in the same manner as the dial 30 which is disposed on the side of the dial back cover 30.

The communication between the information input devices DIAL1 and DIAL2 will be described later herein.

Figure 5:
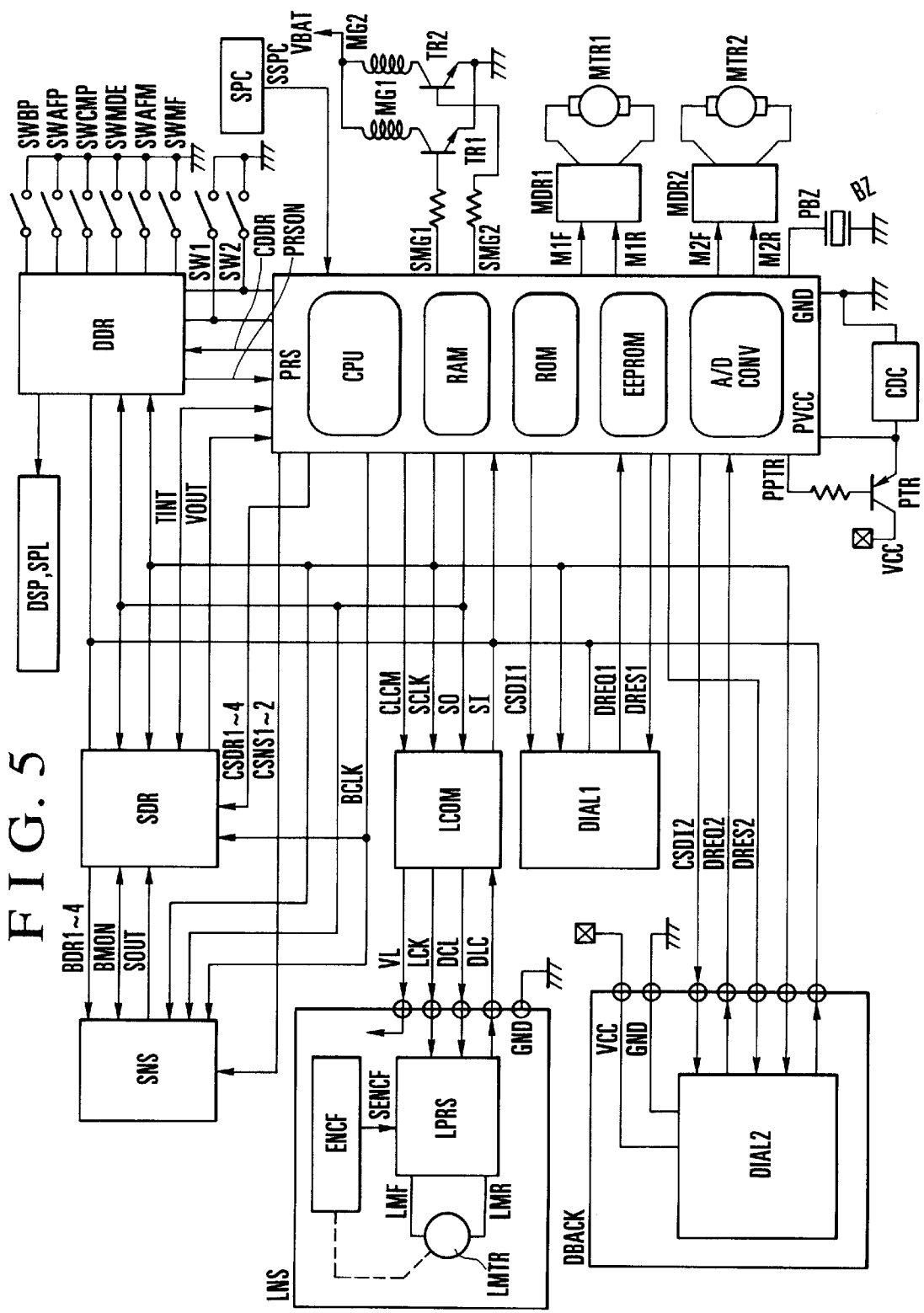
FIG. 5 is a block diagram showing the electrical arrangement of the camera shown in FIG. 1.

FIG. 5 is a block diagram showing an overall electrical arrangement covering the camera body 10 and the dial back cover 20.

Although FIGS. 1 and 5 show the same camera, one shows a mechanical arrangement and the other shows an electrical arrangement of the camera. Therefore, the names of parts used in one figure differ from those used in the other figure for the sake of description. The dial back cover 20 shown in FIG. 1 thus corresponds to a back cover DBACK which is shown in FIG. 5. The display part 40 which is arranged to display the modes of operation of the camera corresponds in part to a part DSP which is shown in FIG. 5.

Referring to FIG. 5, a one-chip type computer PRS (hereinafter referred to as microcomputer) includes, for example, a CPU (a central computing, processing unit) a RAM, a ROM, an EEPROM (an electrically erasable programmable ROM), an A/D converting function, and input and output ports.

The microcomputer PRS is arranged to set a shutter time and an aperture value on the basis of a sequential control program stored in the ROM and to control a series of actions of the camera, such as an automatic exposure control action, an AF action, a film winding action and a film rewinding action.

For this purpose, the microcomputer PRS uses communication signals SO, SI and SCLK and communication selection signals CSDI1, CSDI2, CLCM, CSDR1 to CSDR4 and CDDR for communication with the back cover, peripheral circuits disposed within the camera body 10 and a control device disposed within a lens unit. Various circuits and lens actions are thus controlled through the communication.

The data signal SO is outputted from the microcomputer PRS. The data signal SI is input to the microcomputer PRS. The clock signal SCLK is used as a communication synchronizing signal for the data signals SO and SI. The back cover DBACK which corresponds to the digital (dial) back cover 20 shown in FIG. 1 is detachably attached to the camera body 10 and includes therein the information input device DIAL2 and a switch which is not shown but is arranged to act in association with a dial rotating operation.

The communication contact terminals of the back cover DBACK, those of the camera body 10 and the contacts of the power supply VCC and the grounding terminal GND are arranged to become open when the back cover DBACK is opened, for example, for loading or unloading a film as shown in FIG. 3.

The circuit arrangement of the camera information input device DIAL2 and that of the camera information input device DIAL1 are the same. As mentioned in the foregoing, the information input device DIAL2 is built in the back cover DBACK and the information input device DIAL1 is built in the camera body 10. As shown in FIG. 5, a switch which is not shown but is arranged to act in association with a rotary operation member such as the dial 30 or 15 is connected to each of the information input devices DIAL1 and DIAL2. When the rotary operation member, i.e., the dial, is turned by the operator, information on the dial operation is inputted to the microcomputer PRS by communication.

In the case of the information input device DIAL1, when the operator turns the rotary operation member (the dial 15), the potential level of the signal DREQ1 becomes high (H) to inform the microcomputer PRS that information will be inputted. Upon receipt of the signal DREQ1, the microcomputer PRS makes the level of the selection signal CSDI1 high and, after that, outputs the communication synchronizing clock signal SCLK to receive the data SI. Then, after the initializing signal DRES1 is set at a high level for a predetermined period of time, the level of the initializing signal DRES1 is returned to a low level (L) to initialize (clear) the contents of the information input device DIAL1 to make it ready for the next information input.

The other information input device DIAL2 is disposed inside the back cover DBACK. When the back cover DBACK is open for loading or unloading a film, therefore, the contacts of the information input device DIAL2 for communication with the power supply and the microcomputer PRS become open to prevent any information input by operating the rotary operation member.

The contacts are conductive when the back cover DBACK is in a closed state. In this state, therefore, the information input device DIAL2 makes the level of the signal DREQ2 high to inform the microcomputer PRS that information will be inputted when the operator operates the rotary operation member by turning it. Upon receipt of the signal DREQ2, the microcomputer PRS makes the level of the selection signal CSDI2 high. After that, the microcomputer PRS outputs the communication synchronizing clock signal SCLK to receive the data SI, makes the level of the initializing signal DRES2 high for a predetermined period of time, and makes the level of the initializing signal DRES2 low after the lapse of the predetermined period of time. The contents of the information input device DIAL2 are thus initialized for waiting for the next input of information.

A constant voltage source CDC has an output VBAT of a battery which is not shown inputted thereto. The output VBAT is inputted also to the power supply terminal PVCC of the microcomputer PRS and to a switch-detection-and-display-device driving circuit DDR. Further, a constant voltage VCC is outputted through a transistor PTR under the control of the microcomputer PRS and is supplied to each of electrical elements.

Although it is not shown in FIG. 5, the constant voltage VCC is supplied to every electric element that is performing a digital action. When the back cover DBACK is open, the constant voltage VCC is not supplied only to the information input device DIAL2 which is incorporated in the back cover DBACK. Since the constant voltage VCC is not supplied and no power is supplied to the information input device DIAL2 under that condition, the constant voltage VCC is indicated only at the block of the back cover DBACK, while indication of it is omitted for all other parts of FIG. 5.

A lens communication buffer circuit LCOM is arranged to supply power to the power supply terminal VL for the lens unit and to serve as a communication buffer between the camera body and the lens unit when the level of the selection signal CLCM output from the microcomputer PRS is high.

When the microcomputer PRS sets the signal CLCM at a high level and sends out predetermined data as the signal SO in synchronism with the clock signal SCLK, the lens communication buffer circuit LCOM supplies buffer signals LCK and DCL for the signals SCLK and SO to the lens unit LNS through communication contacts arranged between the camera body and the lens unit. At the same time, the lens communication buffer circuit LCOM causes a signal DLC coming from the lens unit LNS to be outputted as the signal SI. Then, the microcomputer PRS receives lens data in the form of the signal SI in synchronism with the clock signal SCLK.

Figure 9:
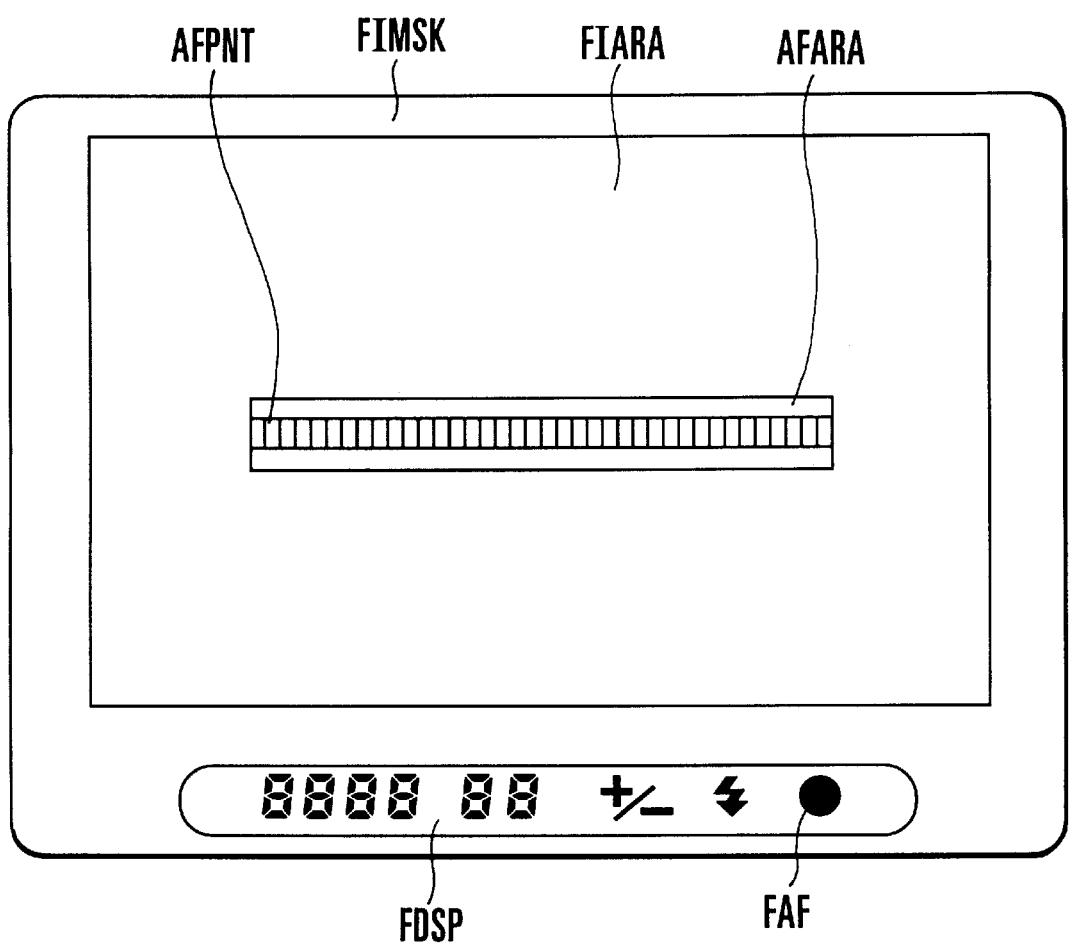
FIG. 9 shows a state of display obtained within the viewfinder of the camera shown in FIG. 1.

The switch-detection-and-display driving circuit DDR is arranged to be selected when a signal CDDR is at a high level. The circuit DDR then communicates with the microcomputer PRS by using the signals SO, SI and SCLK and is controlled according to the data signal SO. More specifically, the switch-detection-and-display driving circuit DDR is arranged to perform change-over of display data of the display part DSP of the camera which includes an inside-viewfinder display FDSP shown in FIG. 9 and to light up and put out display data of an illumination device SPL which is provided for illumination of focus detecting areas AFPNT. What is shown in FIG. 9 will be described in detail later herein.

The switch-detection-and-display driving circuit DDR is further arranged to detect the on- and off-states of switches SW1 and SW2, which are interlocked with a shutter release button 14 shown in FIG. 2, and switches SWAFP, SWCMP, SWMDE, SWAFM and SWMF which are interlocked with various operation members such as operation mode setting buttons or the like. As a result of detection, the microcomputer PRS is informed through a signal PRSON that one of these switches is operated. The circuit DDR is arranged to be capable of detecting the states of these switches without being affected by any chattering that takes place at the time of change-over of on- and off-states of switches.

At each of the switches SW1 and SW2, one of its terminals is grounded while the other is connected to a terminal of the microcomputer PRS. The terminal to which each of the switches SW1 and SW2 is connected is connected to a positive terminal of a battery through a pull-up resistance which is not shown.

The switch SW1 turns on when the shutter release button 14 is pushed down to a first step position of its stroke. The switch SW2 turns on when the shutter release button 14 is pushed further down to a second step position. With the switch SW1 turned on, the microcomputer PRS lowers the level of a terminal to which the transistor PTR is connected through a resistor, to a low level to cause the transistor PTR to turn on. Then, a timer which is built in the microcomputer PRS is initialized and caused to start time counting. After the lapse of a predetermined time, the transistor PTR is turned on to newly supply power to electrical elements. Then, light measuring and AF actions are performed.

In a case where the switch SW1 again turns on while the built-in timer is still in process of counting time, the built-in timer which is used for control over supply of power is initialized and then is caused to restart counting time. Then, after the lapse of a predetermined time counted by the built-in timer, the transistor PTR is turned off to stop the supply of power to the electrical elements.

Further, when the switch SW2 turns on, the turning-on of the switch SW2 triggers exposure control. After that, the film is wound up.

The switch SWBP is arranged to be in an off-state while the back cover DBACK is open and turn on when the back cover DBACK is closed. The switch SWCMP is an exposure compensation switch which is arranged to turn on when the exposure compensation button 12 is pushed. The switch SWAFP is a focus detecting area selection switch which is arranged to turn on when the focus detecting area selection button 13 is pushed. The switch SWMDE is an exposure control mode selection switch which is arranged to turn on when the exposure control mode selection button 17 is pushed. The switch SWAFM is a focusing mode selection switch which is arranged to turn on when the focusing mode selection button 18 is pushed. The switch SWMF is a light measuring mode selection switch which is arranged to turn on when the light measuring mode selection button 19 is pushed.

In other words, these switches SWCMP, SWAFP, SWMDE, SWAFM and SWMF are interlocked with the buttons 12, 13, 17, 18 and 19, respectively, shown in FIG. 1.

A motor MTR1 is provided for transporting the film. A motor MTR2 is provided for moving a mirror up and down and also for charging the shutter blades. These motors make forward and reverse rotations respectively under the control of driving circuits MDR1 and MDR2. The microcomputer PRS supplies these driving circuits MDR1 and MDR2 with signals M1F, M1R, M2F and M2R.

Electromagnets MG1 and MG2 are provided respectively for causing the leading and trailing shutter blades to start their travels. The shutter is controlled by the microcomputer PRS by energizing these electromagnets MG1 and MG2 through signals SMG1 and SMG2 and amplifying transistors TR1 and TR2.

A control circuit LPRS is disposed within the lens unit LNS. A signal DCL is arranged to be inputted to the control circuit LPRS in synchronism with the lens communication clock signal LCK. The signal DCL carries data as instructions from the camera to the lens unit LNS. Actions to be performed by the lens unit LNS in response to the instructions are predetermined.

The control circuit LPRS within the lens unit LNS analyzes the instructions in accordance with predetermined procedures. The control circuit LPRS executes focus adjusting and aperture control actions accordingly and outputs a signal DLC to inform the microcomputer PRS of the operating states of various parts of the lens unit LNS, such as a state of driving the focusing optical system, a state of driving the iris, etc.

When an instruction for focus adjustment is sent from the camera body, the control circuit LPRS outputs a signal LMF or LMR for driving the focus adjusting motor LMTR according to the data which indicates the amount and direction of driving and is sent from the camera at the same time as the instruction. Then, the focusing optical system is moved for focus adjustment in the optical axis direction.

The amount of movement of the focusing optical system is detected by means of a photo-coupler through the pattern of a pulse disk which rotates in association with the movement of the focusing optical system. Then, an encoder circuit ENCF outputs a number of pulses corresponding to the amount of movement of the optical system as a pulse signal SENCF. The amount of movement of the optical system is monitored through the pulse signal SENCF and the pulses are counted by a counter which is disposed within the lens control circuit LPRS. When the count value thus obtained comes to coincide with the amount of movement sent to the circuit LPRS, the control circuit LPRS controls the motor LMTR by making the level of the signal LMF or LMR low.

Therefore, after a focus adjusting instruction is sent from the camera body, the microcomputer PRS which is a control device on the side of the camera body has nothing to do with lens driving until the lens driving action of the lens unit LNS comes to an end. Further, the control circuit LPRS is arranged to be capable of sending information on the content of the counter to the camera body upon receipt of a request for it.

A sensor SPC for exposure control is arranged to receive light coming from an object through the lens unit LNS. A signal SSPC from the sensor SPC is inputted to an analog input terminal of the microcomputer PRS. After A/D conversion, the signal SSPC is used for automatic exposure control according to a predetermined program.

An AF area sensor SNS is arranged to be driven by a driving device SDR. The driving device SDR is provided with a charge storing control part which is arranged to be capable of independently performing charge storing control. The driving device SDR is thus arranged to carry out a series of driving actions on a preselected line sensor of the AF area sensor device SNS according to a preselected driving mode, including its initialization and image signal storing and reading actions in synchronism with the clock signal which is supplied from the microcomputer PRS as an operation reference clock.

The functions of the AF sensor driving device SDR are selected in accordance with the contents of the signals CSDR1 to CSDR4, the communication synchronizing clock signal SCLK and the data signal SO as input.

A signal TINT is used in a bidirectional manner by the microcomputer PRS and the AF sensor driving device SDR for charge storage ending control and detecting actions on the selected line sensor of the AF area sensor device SNS. A signal VOUT is obtained by amplifying an image signal SOUT from the AF area sensor device SNS on the basis of the content of data received through the data signal SO. The signal VOUT is supplied to the analog input terminal of the microcomputer PRS. Upon receipt of the signal VOUT, the microcomputer PRS A/D-converts it to obtain a digital value and executes a series of processes including AF processing and computing actions on the basis of the digital value thus obtained.

Signals BDR1 to BDR4 are used in combination for driving timing control over the initializing, charge storing and image-signal reading actions on the selected line sensor of the AF area sensor device SNS.

A signal BMON is used in a bidirectional manner between the AF area sensor device SNS and the AF sensor driving device SDR and corresponds to the selected line sensor of the AF area sensor device SNS.

The AF area sensor device SNS outputs a data signal SOUT corresponding to the quantity of light with which each line sensor is illuminated. The AF sensor driving device SDR examines the data signal SO to find if the level of the signal BMON has reached a predetermined level. If so, the AF sensor driving device SDR supplies a charge storing completion signal in the form of the signal BMON to the AF area sensor device SNS and in the form of the signal TINT to the microcomputer PRS. The details of the AF sensor driving device SDR will be described later herein with reference to FIG. 9.

The AF area sensor device SNS is a light receiving element of the focus detecting device and is an area sensor having two vertical light receiving areas, each of which consists of I picture elements in the horizontal direction and K picture elements in the vertical direction. In this case, two line sensors corresponding to one row in the vertical direction of the two light receiving areas are called a line sensor pair. The area sensor is thus composed of K pairs of line sensors of I picture elements.

Each line sensor is formed by continuously arranging a plurality of known storage type photo-electric conversion elements. Each line sensor pair is simultaneously initialized and stored with I picture elements, and a reading driving action on them is performed in each line sensor pair. The storage control is thus performed in each line sensor pair. The storage control over the selected line sensor pair is performed through the AF sensor driving device SDR and the storage monitor signal BMON.

The line sensor pair to be driven by the AF sensor driving device SDR and one of the functions of the AF area sensor device SNS are selected according to the signals CSNS1 and CSNS2 from the microcomputer PRS and the content of data obtained through the data signal SO.

The signal BCLK is a reference clock signal for operating the AF sensor driving device SDR. The AF area sensor device SNS is driven in synchronism with the signal BCLK. The signals BDR1 to BDR4 to be supplied to the AF area sensor device SNS are used for carrying out a series of sensor driving actions including initializing, storing and reading actions.

The respective line sensor pairs are arranged on one and the same chip for each of a plurality of focus detecting areas which jointly form a focus detectable range AFARA of a display to be made within the viewfinder of the camera as shown in FIG. 9. The details of the AF area sensor device SNS will be described later with reference to FIG. 10.

A sound emitting body BZ is arranged to inform the operator of a working state of the camera. For example, the sound emitting body BZ is driven by the microcomputer PRS to emit a sound when an in-focus state is attained by automatic focusing.

The image forming optical system of the focus detecting device is next described with reference to FIG. 8.

Figure 21:
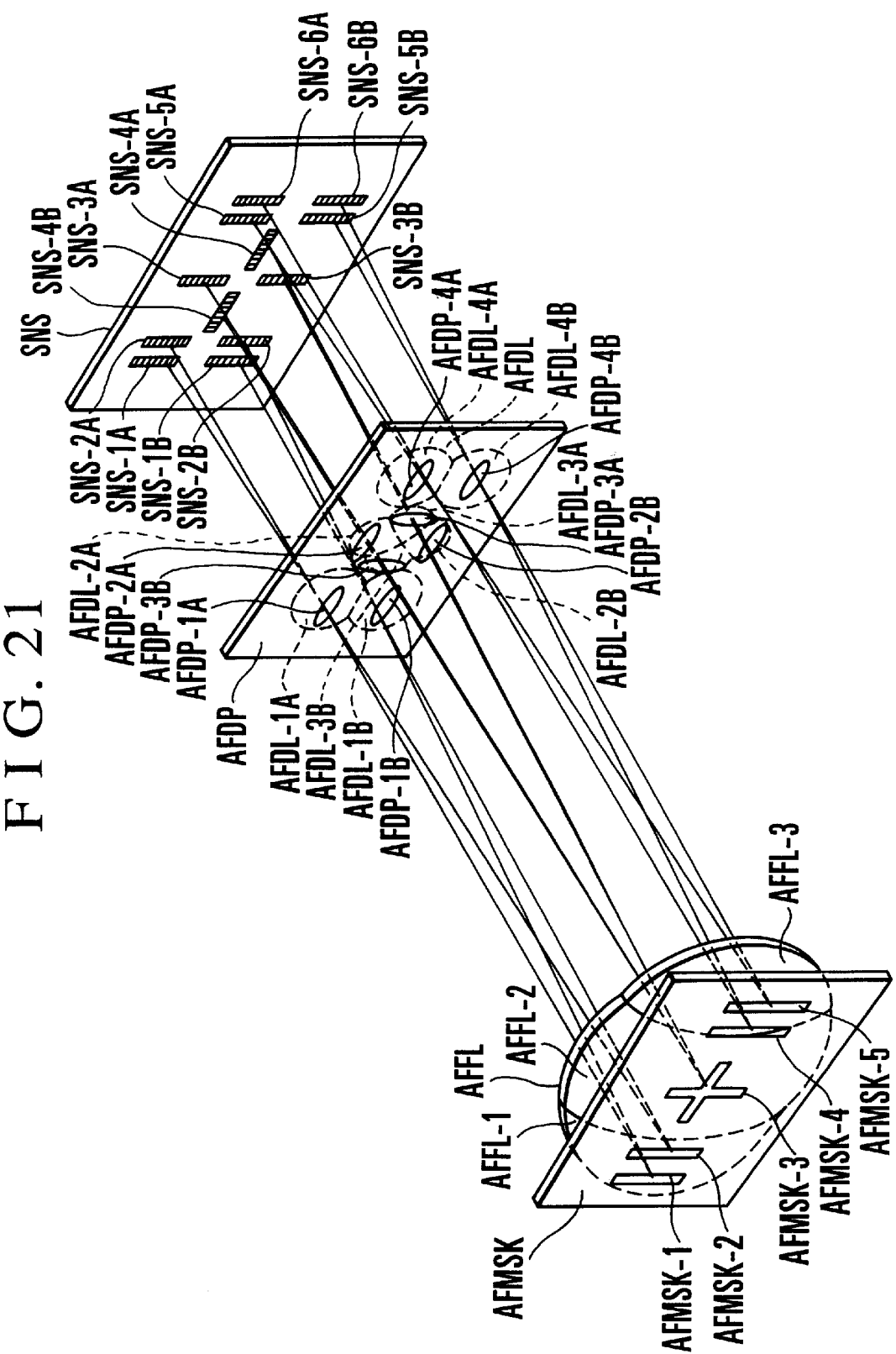
FIG. 21 is a perspective view showing an automatic focusing optical system of the conventional camera.
Figure 22:
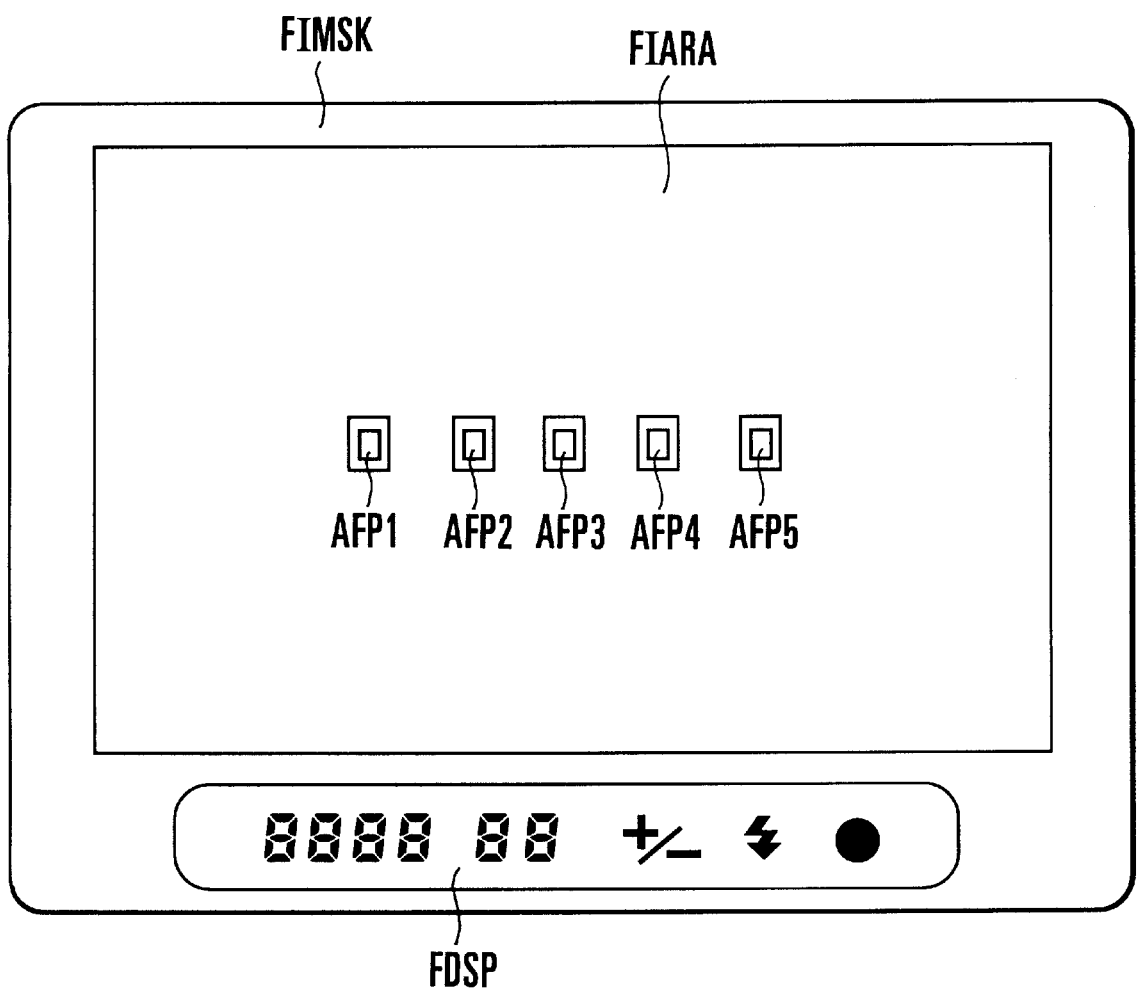
FIG. 22 shows focus detecting areas arranged inside the viewfinder of the conventional camera.

The image forming optical system is of the phase difference type which is well known and, therefore, requires no description. Since the basic principle of the image forming optical system is the same as that of the system of the prior art shown in FIG. 21, the component members which are the same as those of the prior art system are called by the same names.

Figure 8:
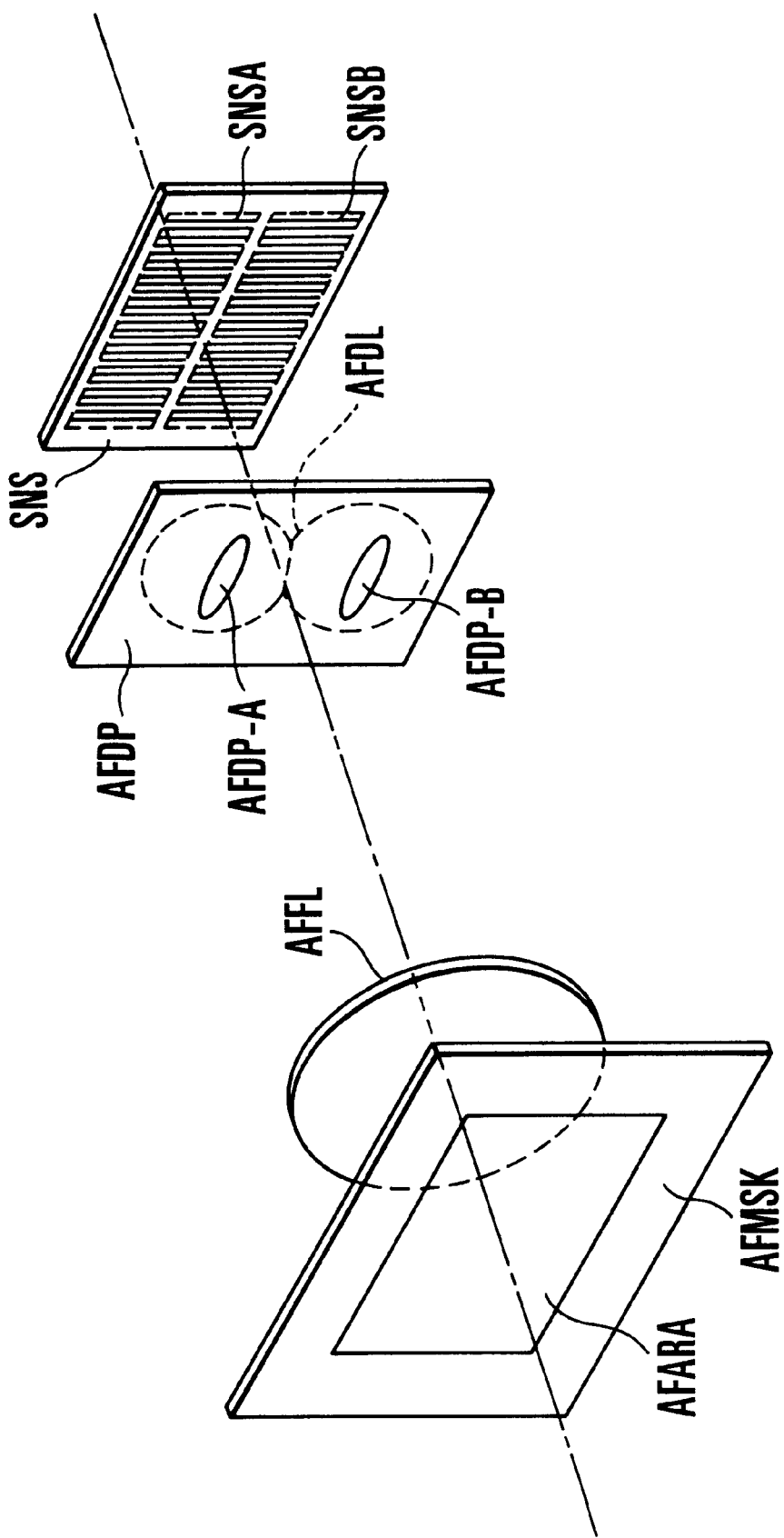
FIG. 8 is a perspective view showing an automatic focusing optical system of the camera shown in FIG. 1.

Referring to FIG. 8, a field mask plate AFMSK is arranged in the neighborhood of a predetermined image forming plane to have a single wide distance measuring field aperture (focus detectable range) AFARA. The inside of the aperture AFARA defines a focus detectable range. A secondary image forming lens AFDL which is composed of a pair of positive lenses is arranged to cause the image of an object of photographing defined by the focus detectable range AFARA to be formed again on the pairs of area sensors SNSA and SNSB of the AF area sensor device SNS.

Information on light received by each pair of area sensors of the AF area sensor device SNS is read out as electrical signals indicating information on images locally obtained in corresponding positions. A correlation computing operation is performed on the signals to obtain a value indicative of the focusing state of the objective lens on the object in each position. A stop plate AFDP is placed in front of the secondary image forming lens AFDL. The stop plate AFDP has stop holes AFDP-A and AFDP-B which are arranged to restrict a light flux incident on each of the positive lenses. The stop plate AFDP is positioned approximately where an image can be formed at the position of the exit pupil of the photo-taking objective lens by the power of a field lens AFFL.

Numerous line sensors are arranged on one and the same chip in the AF area sensor device SNS. Control of varied kinds is performed by using these line sensors in pairs. However, they may be serially used, instead of using them in pairs, if the control can be carried out as desired in that manner.

Since the optical image is separated into two images, there is a boundary area which is not optically used between the two optical images in general. The area of the chip, therefore, can be reduced to a smaller size by arranging a peripheral circuit in the boundary area.

The relation of areas to be used by the AF area sensor device SNS for focus detection to a viewfinder field is next described below with reference to FIG. 9.

FIG. 9 shows a state of the viewfinder as viewed through the eyepiece part 11. In FIG. 9, reference symbol FIMSK denotes a field mask which defines the field area of the viewfinder. Reference symbol FIARA denotes a photo-taking area viewable through the lens mounted.

A focus detectable range within the viewfinder field in the photo-taking area FIARA is equivalent to the area AFARA shown in FIG. 8 and is, therefore, labeled in the same way.

The operator selects a desired focus detecting area from among a plurality of focus detecting areas which jointly form the focus detectable range AFARA. Each of the focus detecting areas corresponds to each of the line sensor pairs constituting the AF area sensor device SNS shown in FIG. 10 as will be described later. A focus detecting area AFPNT which is selected by the operator is indicated by a red light along the inner peripheral area of the quadrilateral shape of the selected area with the red light lighted up for a short period of time which is sufficiently long for confirmation by the operator.

A liquid crystal display (LCD) device FDSP is arranged within the viewfinder to display photo-taking information within the viewfinder. A shutter time, an aperture value of the lens, an exposure compensation value, a flash-device-ready state and a result of focus detection can be displayed by the display device FDSP. The result of focus detection is displayed by lighting up an in-focus mark FAF. The in-focus mark FAF is lit when an in-focus state is attained and is flickered when focus cannot be adequately adjusted.

Incidentally, FIG. 9 shows a state in which all the display parts are lit, for the sake of description. In actuality, when the camera is operated, the display parts are independently lit in accordance with the operating condition of the camera, so that all the display parts would not be simultaneously lit as shown in FIG. 9.

Figure 10:
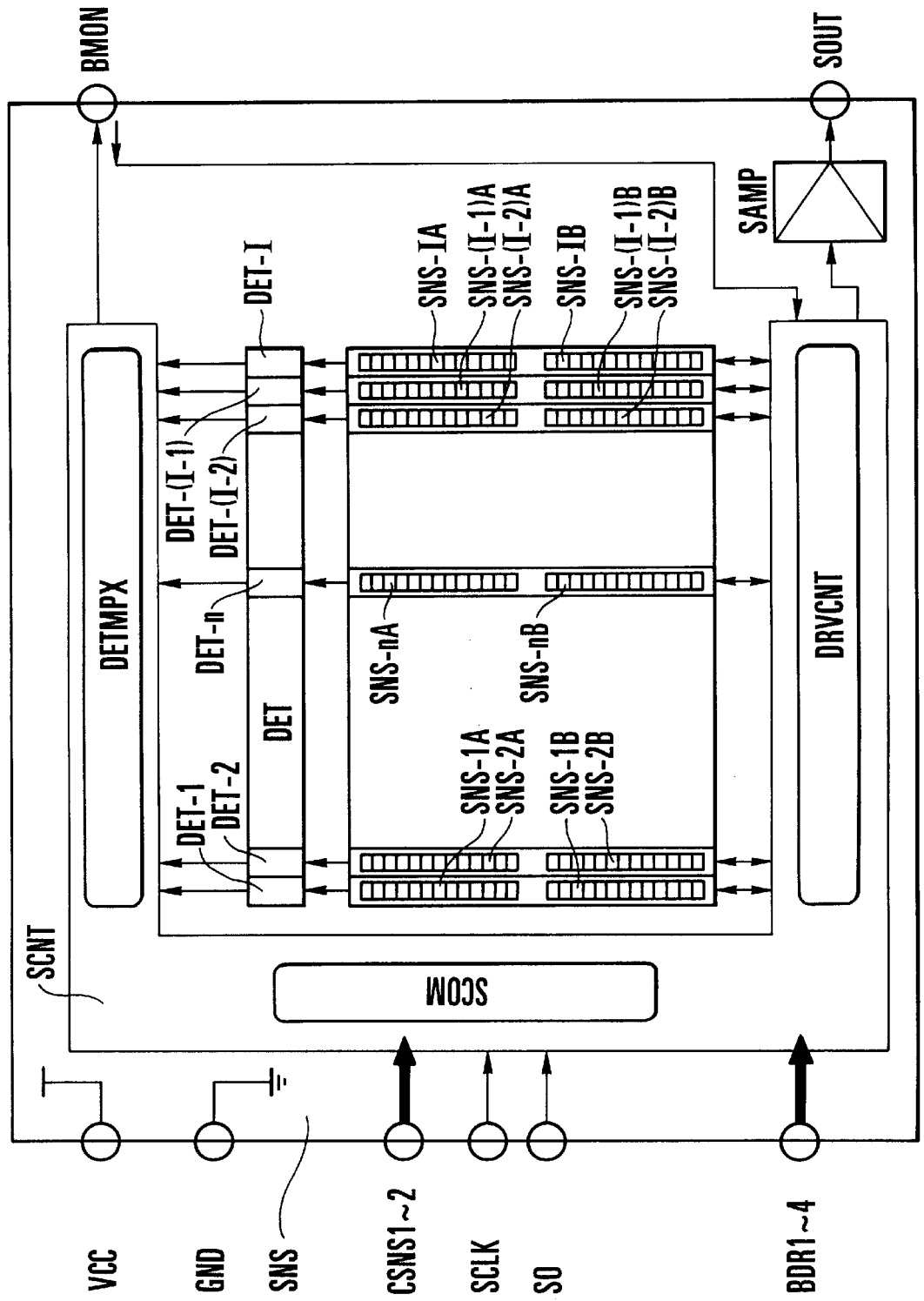
FIG. 10 is a block diagram showing the arrangement of an AF area sensor device shown in FIG. 5.

The AF area sensor device SNS is next described in detail with reference to FIG. 10.

In the case of this embodiment, the AF area sensor device SNS is composed of area sensors arranged, by way of example, to store an electric charge proportional to incident light in the base parts of transistors and, in reading, to output a signal corresponding to the stored amount of electric charge from each of the line sensors. However, the AF area sensor device SNS may be replaced with a known CCD sensor or a known MOS sensor so long as required functions can be accomplished.

The above-stated area sensor device is composed of a storage type photo-electric conversion element train formed by aligning a plurality of phototransistors as disclosed, for example, in Japanese Laid-Open Patent Applications No. SHO 60-12579 to SHO 60-12765. Since the operations of the photo-electric conversion elements were disclosed in the publication of the patent applications cited, the details of them are omitted herein.

The AF area sensor device SNS is the light receiving element of the focus detecting device and is composed of I line sensor pairs from SNS-1A and SNS-1B through SNS-IA and SNS-IB, a control part SCNT, a storage monitor signal output part DET and a signal amplifying part SAMP. The storage monitor signal outputting, storing and reading actions are controlled and driven in each line sensor pair.

Each of the sensors SNS-1A and SNS-1B to SNS-IA and SNS-IB is a line sensor formed by continuously aligning a plurality of photo-electric conversion elements. The sensors SNS-1A and SNS-1B constitute one line sensor pair. The sensors SNS-2A and SNS-2B to SNS-IA and SNS-IB are arranged in the same manner.

The electric charge signal output from each of the line sensor pairs is inputted to a driving part DRVCNT which is disposed within the control part SCNT. The control part SCNT is arranged to select the storage monitor signal output, to drive the line sensor pair and to select the line sensors to be used for reading, on the basis of information coming through communication from the microcomputer PRS and a signal from the AF sensor driving device SDR.

Communication with the microcomputer PRS is conducted by using the signals SCLK, SO, CSNS1 and CSNS2.

The control part SCNT is composed of three blocks which include a communication part SCOM, a multiplexer DETMPX and the driving part DRVCNT.

The communication part SCOM is arranged to communicate with the microcomputer PRS and to transfer information thus received to the multiplexer DETMPX and the driving part DRVCNT. The multiplexer DETMPX is arranged to select the line sensor pair to be subjected to the storage control, on the basis of the information from the communication part SCOM. More specifically, a signal is selected from among the signals of detecting blocks DET-1 to DET-I according to the contents of communication with the microcomputer PRS. The signal selected is outputted as a storage monitor signal to a terminal BMON by operating a switch built in the multiplexer DETMPX, which will be described in detail later herein.

The driving part DRVCNT is arranged to operate on the basis of signals BDR1 to BDR4 coming from the AF sensor driving device SDR. Initializing and storing-start driving actions are performed on all the line sensors at the same time. A reading driving action is performed in units of each line sensor pair on the basis of information from the communication part SCOM.

A signal inputted from the terminal BMON is a signal for transferring the photo-electrically converted signals of the line sensor pairs to a reading driving part which is not shown. This input signal is valid only for the line sensor pair for which the multiplexer DETMPX outputs the storage monitor signals from a storage monitor signal output part DET to the terminal BMON.

The electric charge signals read out from the line sensor pair by the driving part DRVCNT are input to the signal amplifying part SAMP. The input signals are amplified by the signal amplifying part SAMP at a predetermined rate of amplification before they are outputted from a terminal SOUT, so that these signals can be protected from an adverse effect of a disturbance such as a noise. The storage monitor signal output part DET includes independent detection blocks DET-1 to DET-I each of which is arranged to be correlated to one line sensor pair in the ratio of 1:1 and output and supply the storage monitor signals of the corresponding line sensor pair to the multiplexer DETMPX.

The storage monitor signals output from the plurality of photo-electric conversion elements constituting the line sensor pair are processed to detect the largest output and the smallest output. After that, a difference between the largest and smallest outputs is obtained as a contrast component.

For example, the detection block DET-1 detects the largest and smallest outputs from the outputs of the plurality of photo-electric conversion elements constituting the line sensor pair "SNS-1A and SNS-1B" and outputs a contrast component which represents a difference between the two outputs as a storage monitor signal.

Further, the largest output is compared with a preset saturation level to find if the photo-electric conversion element is saturated. If so, this fact is outputted through the terminal BMON to inform the AF sensor driving device SDR.

The terminal BMON is arranged to bidirectionally transfer and receive signals to and from the AF sensor driving device SDR. The AF area sensor device SNS is arranged such that the signal from the storage monitor signal output part DET is output through the multiplexer DETMPX while the signal from the AF sensor driving device SDR is input to the control part SCNT.

The operations of the information input devices DIAL1 and DIAL2 shown in FIG. 5 are next described below with reference to FIG. 6.

As mentioned in the foregoing, the information input devices DIAL1 and DIAL2 are separate circuit blocks arranged in the same manner with the exception of signal terminals, etc. In FIG. 6, only each of the different parts such as signal terminals, etc., is indicated by two names applicable to the two devices DIAL1 and DIAL2.

The dial switches SWDIAL21 and SWDIAL22 and the dial switches SWDIAL11 and SWDIAL12 are omitted from the illustration of FIG. 5.

Of the names (symbols) indicated together, DRES1, CSDI1, DREQ1, SWDIAL11 and SWDIAL12 correspond to the information input device DIAL1, while DRES2, CSDI2, DREQ2, SWDIAL21 and SWDIAL22 correspond to the information input device DIAL2. The following describes the component parts of the information input device DIAL2.

A power supply VCC is supplied with power through the transistor PTR under the control of the microcomputer PRS. Reference symbol GND denotes the ground.

An up-down counter DIALCNT is arranged to perform a counting action according to input signals coming from the dial switch SWDIAL21 and SWDIAL22. A parallel-to-serial converter PDCONV is arranged to convert parallel input data coming from the up-down counter DIALCNT into serial data and to output it from a terminal SOUT in synchronism with a clock signal input to a clock terminal CLK. A counter CLKCNT is arranged to count the pulses of a clock signal coming from an AND gate GAND and to output and supply a signal to an OR gate GOR2 when a predetermined number of pulses are counted.

An OR gate GOR1 is arranged to output a request signal for communication toward the camera body when any of parallel outputs from the up-down counter DIALCNT is at a high level. When the level of a terminal DRES2 is at a high level, the level of the output of the OR gate GOR2 also becomes high to reset the two counters DIALCNT and CLKCNT. Therefore, the operation begins when the level of the terminal DRES2 becomes low.

The input terminals CONT and CLK of the up-down counter DIALCNT are connected respectively to the dial switches SWDIAL21 and SWDIAL22, which correspond to the terminals 31b and 31c shown in FIG. 4.

In the case of the information input device DIAL1, the terminals DRES2, DREQ2, and CSDI2 of the information input device DIAL2 correspond respectively to the terminals DRES1, DREQ1 and CSDI1. The dial switches SWDIAL21 and SWDIAL22 of the information input device DIAL2 correspond respectively to the dial switches SWDIAL11 and SWDIAL12 of the information input device DIAL1. With the exception of these parts, all other parts of the information input device DIAL1 are labeled and arranged in the same manner as those of the information input device DIAL2 and thus require no further description of them.

Here, the information input device DIAL2 operates in the following manner.

Referring to FIG. 7(A), when the dial 30 is rotated clockwise to the extent of one click, the dial switch SWDIAL22 turns on. The dial switch SWDIAL21 next turns on. After that, the dial switch SWDIAL22 turns off and the dial switch SWDIAL21 next turns off.

The signals vary in this manner when the dial 30 is operated clockwise. The counter DIALCNT counts when the lever of the terminal CLK rises to a high level and down counts when the level of the terminal CONT is at a low level. The counter DIALCNT is thus arranged to up count the rise to a high level. Therefore, when the dial switch SWDIAL22 turns off, the counter DIALCNT down counts as the dial switch SWDIAL21 then turns on.

Referring to FIG. 7(B), when the dial 30 is rotated counterclockwise to the extent of one click, on the other hand, the dial switch SWDIAL21 turns on. The dial switch SWDIAL22 next turns on. After that, the dial switch SWDIAL21 turns off and the dial switch SWDIAL22 next turns off. The signals vary in this manner. Since the dial switch SWDIAL21 is in the off-state when the dial switch SWDIAL22 turns off as shown in FIG. 7(B), the counter DIALCNT then up counts.

The counter DIALCNT thus can be caused to down count every time the dial 30 is rotated clockwise to the extent of the one click and to up count every time the dial 30 is rotated counterclockwise to the extent of one click. The OR gate GOR2 outputs a high level signal when the output of the counter DIALCNT is not at "0".

The output from the terminal DREQ2 of the information input device DIAL2 is arranged to be inputted to the microcomputer PRS. When the level of the output from the terminal DREQ2 becomes high, the microcomputer PRS judges that the dial 30 has been rotated and conducts serial communication. The microcomputer PRS then sends a communication clock signal to the terminal SCLK of the information input device DIAL2. In synchronism with the clock signal, the parallel outputs of the counter DIALCNT are supplied to the parallel-to-serial converter PDCONV. The parallel-to-serial converter PDCONV then converts the parallel outputs of the counter DIALCNT into serial data. At that time, the counter CLKCNT counts the waveform of the signal coming from the terminal SCLK and outputs a high level signal to the OR gate GOR2 when eight clock waves (one communication amount) is counted.

The output level of the OR gate GOR2 changes to a high level to clear the counters DIALCNT and CLKCNT simultaneously. With the counter DIALCNT cleared, the level of its output for the OR gate GOR1 is made low and the counter DIALCNT returns to an initial state.

A count value of the operation of the dial thus can be read by clearing the counter DIALCNT every time eight bits are communicated in the above-stated manner.

Further, the dial back cover 20 is provided with a dial lock switch 21 as shown in FIG. 1. Although it is not shown in FIGS. 5 and 6, the dial lock switch 21 is connected to an input terminal of the OR gate GOR2. When the dial lock switch 21 is set in its off-state, the terminal RES of the counter DIALCNT is kept at a high level through the OR gate GOR2. Then, the counter DIALCNT is brought into a reset state. With the counter DIALCNT in the reset state, the output terminal group CNTOUT of the counter DIALCNT remains at a low level. The level of the terminal DREQ2 also becomes low. Therefore, it becomes impossible to make any input from the dial 30.

Referring to FIG. 11 to FIGS. 14(a) and 14(B) which are flow charts, the operations of circuits are described as follows.

Figure 11:
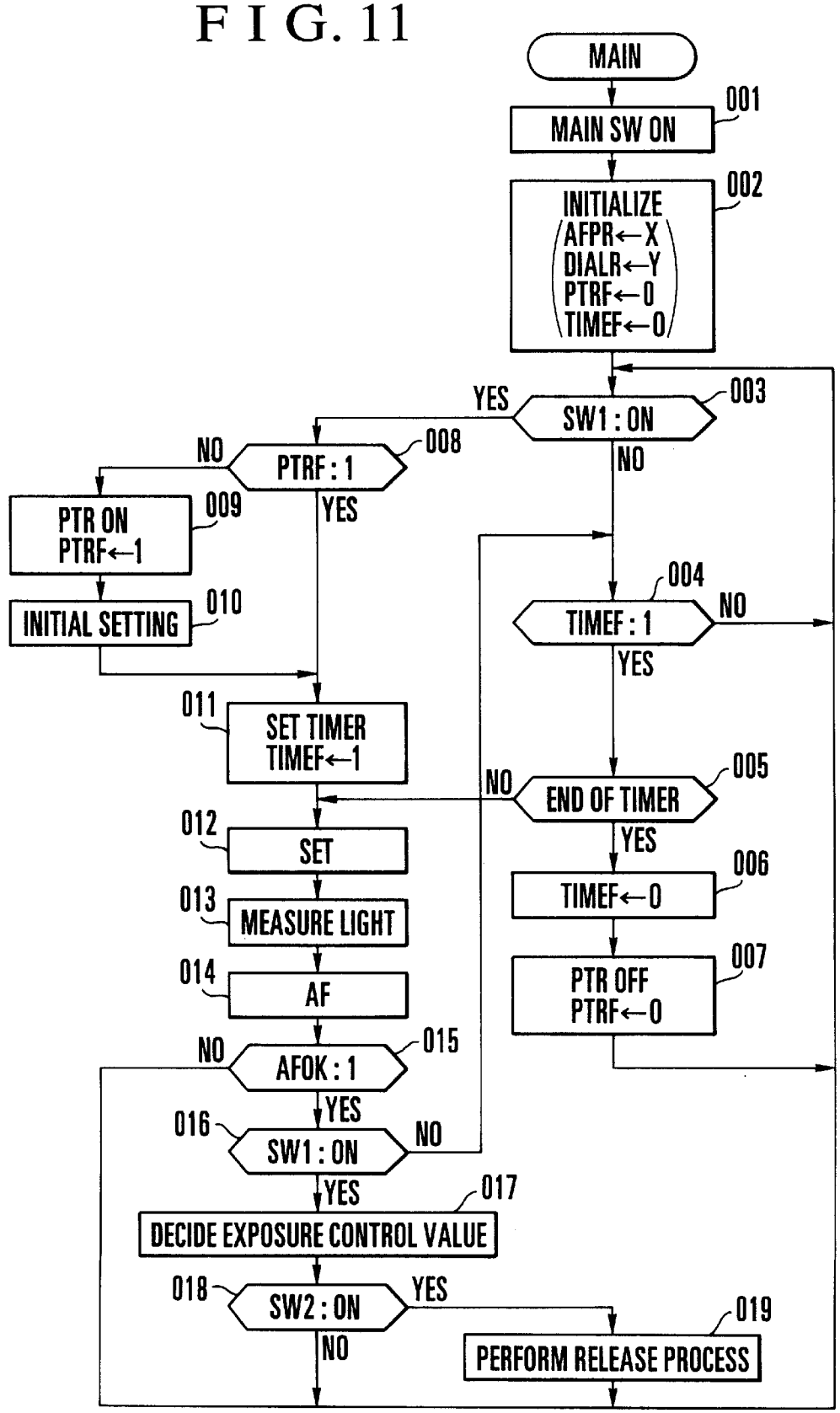
FIG. 11 is a flow chart showing a main operation of the camera shown in FIG. 1.

A main operation of the camera is first described with reference to the flow chart of FIG. 11. When a main switch which is disposed on the rear side of the camera is closed (turned on), the flow of operation begins at a step 001.

At the step 001, when the switch-detecting-and-display-driving circuit DDR detects that the main switch which is not shown has turned on, the signal PRSON is sent out indicating that the main switch is operated. Then, the details of the switch operation are sent by communication using the signals SCLK, SO and SI.

At a step 002, with the signal indicating that the main switch has turned on received from the switch-detecting-and-display-driving circuit DDR, the microcomputer PRS performs a series of initial actions including an initializing action on flags, registers, ports, etc., reading data out from its built-in ROM as necessary, storing the data at a predetermined position of a memory, and sending, to the switch-detecting-and-display-driving circuit DDR, data for a photo-taking mode of the camera, etc., to be displayed at the display part DSP.

Further, apposite values are substituted into the registers AFPR (for data of the focus detecting position) and DIALR (for dial data) which are disposed within the microcomputer PRS. Flags PTRF and TIMEF which are also disposed within the microcomputer PRS are respectively cleared to "0". Each of output ports of the microcomputer PRS is also initialized. Upon completion of the initial actions, the flow proceeds to a step 003.

At the step 003, a check is made for the state of the switch SW1 which is arranged to turn on when the shutter release button is pushed down to its first step position. If the switch SW1 is found to be in its on-state, the flow proceeds to a step 008 to check the flag PTRF. The flag PTRF is arranged to indicate the state of a port PPTR of the microcomputer PRS which is connected to the base of the transistor PTR through a resistor. The transistor PTR is in an off-state if the flag PTRF is at "0" and is in an on-state if the flag PTRF is at "1". If the flag PTRF is at "1", the flow proceeds to a step 011. If not, the flow proceeds to a step 009.

Since the flag PTRF is at "0" immediately after the main switch is turned on, the flow proceeds to the step 009. At the step 009, the port PPTR is controlled to turn on the transistor PTR and to set the flag PTRF at "1" by lowering its level.

When the transistor PTR turns on, power is supplied to the terminal VCC from the constant voltage source CDC. The power is then supplied to the exposure control sensor SPC, the AF sensor driving device SDR, the AF area sensor device SNS, etc., which are arranged to be supplied with power only when necessary.

At a step 010, the microcomputer PRS conducts communication with the electric elements to which power is supplied and the photo-taking lens unit LNS mounted on the camera through the mount to obtain data necessary for a series of data processing actions such as light measuring computation, AF control, etc. The data thus obtained is stored at a predetermined position in the memory. At the step 011, the timer arranged within the microcomputer PRS to decide the duration time of the on-state of the transistor PTR is set and actuated. The flag TIMEF which indicates that the built-in timer is in process of time counting is set at "1". The flag TIMEF is at "1" to indicate that the timer is in process of time counting and at "0" when the time count is either finished or before the commencement thereof.

The length of one round of time count by the timer disposed within the microcomputer PRS is arranged to be longer than a length of time required for the flow to execute the processes of the steps 003→008 to 019, or the processes of the steps 003→004→005→012 to 019 or the processes of the steps 003 to 007, and, then, return to the step 003.

At the next step 012, if information on a shutter time value, an aperture value, exposure compensation, etc., has been newly input with any of the applicable switches operated, the camera is set according to the information input and a display is made accordingly.

At a step 013, a series of light measuring processes is executed. More specifically, an output from the exposure control sensor SPC is converted into a digital value by an A/D converter disposed within the microcomputer PRS to obtain exposure data. Then, by using the information obtained from the photo-taking lens unit LNS, a computing operation is performed according to the photo-taking mode of the camera currently set to obtain optimum exposure control information.

The exposure control information thus obtained is supplied from the microcomputer PRS to the switch-detecting-and-display-driving circuit DDR to be displayed at the display part DSP.

A step 014 is a subroutine for executing a series of AF processes. The details of the AF subroutine will be described later.

At the next step 015, a flag AFOK is checked for the result of focusing, i.e., to find if an in-focus state has been attained. The flag AFOK is set at "1" if an in-focus state has been attained by the processes of the AF subroutine and is at "0" if the focus adjustment is found to be inadequate or impossible. In the case of an in-focus state, the flow proceeds to a step 016 to make a check to find if the switch SW1 is in an on-state.

If the switch SW1 is found to be in its on-state, the flow proceeds to a step 017. At the step 017, an exposure control value is decided according to the result of the light measuring action of the step 013 and the focus state of each focus detecting area attained by the AF action of the step 014. At a step 018, a check is made to find if the switch SW2 is in its on-state. If so, the flow proceeds to a step 019 to execute a shutter release process.

At the step 019, the release process is executed to cause a main mirror (not shown) to be moved up through the motor driving circuit MDR2. The diaphragm of the photo-taking lens unit LNS is caused to be stopped down to an aperture value through the lens communication buffer circuit LCOM. Then, the leading shutter blade is caused to travel at a shutter speed through the shutter control signal SMG1. The aperture value and the shutter speed (time) are decided according to an exposure value detected by the exposure control sensor SPC and the sensitivity of a film loaded on the camera. The trailing shutter blade is closed after the lapse of the shutter time decided.

After completion of an exposure action on the film, the mirror is moved down and the shutter is charged. At the same time, the film is transported to the extent of one frame and a series of shutter release processes comes to an end.

If either the flag AFOK is found to be at "0" at the step 015 or the switch SW2 is found to be in its off-state at the step 018, the flow returns to the step 003 to find again if the switch SW1 is in its on-state. Further, if the switch SW1 is found to be in its off-state at the step 016, the flow proceeds to a step 004.

When the flow is at the step 003, if the switch SW1 is not in its on-state and is found to be in its off-state, the flow proceeds also to the step 004. At the step 004, a check is made for the state of the flag TIMEF. If the flag TIMEF is found to be at "1", the flow proceeds to a step 005. At the step 005, a check is made to find if the time count by the timer disposed within the microcomputer PRS has come to an end. If not, the photo-taking operation of the camera is assumed to be still in process and the flow proceeds again to the step 012.

If the timer is found at the step 005 to have finished its time count, the flow proceeds to a step 006. At the step 006, the flag TIMEF is set at "0" to indicate that the timer has finished its time count. At the next step 007, the microcomputer PRS sets the port PPTR at a high level to stop the supply of power to the terminal VCC by turning off the transistor PTR.

Further, at the step 007, the flag PTRF is set at "0" to indicate that the transistor PTR is in its off-state. The camera is thus brought into a state of being readied for photo-taking. The flow then returns to the step 003 to make a check for the state of the switch SW1 to decide whether the camera is to be set into a photo-taking state or not.

If the flag TIMEF is found at the step 004 to be not at "1", thus indicating that the camera is in a state of being readied for photo-taking, the flow returns to the step 003 to make a check for the state of the switch SW1 to decide whether the camera is to be set into a photo-taking state or not. Therefore, while the camera is in the state of being readied for photo-taking, the steps 004 and 003 are repeatedly executed.

The main operation of the camera is performed in the manner as described above.

The AF operation of the camera is next described with reference to the flow chart of FIG. 12 as follows.

Figure 12:
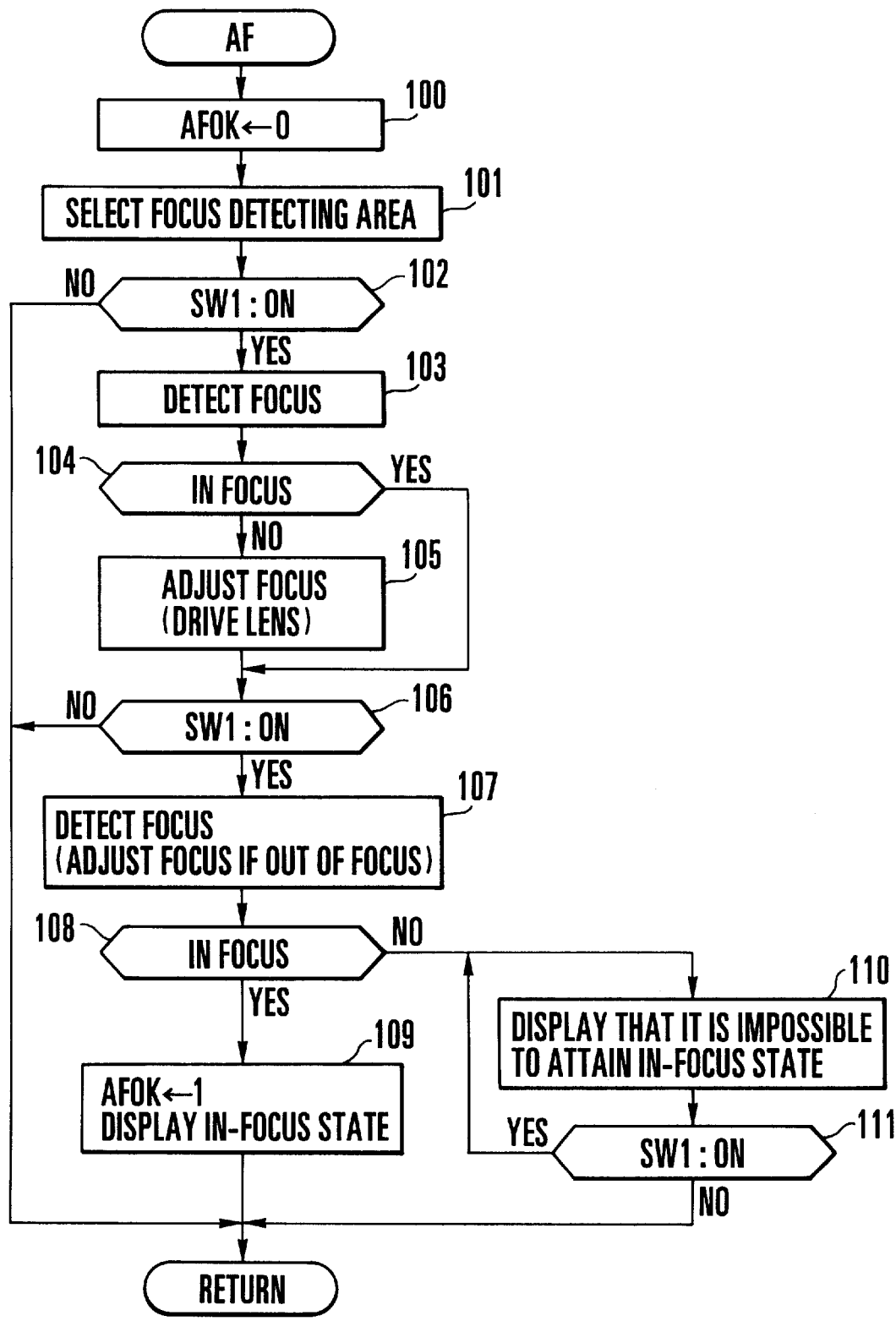
FIG. 12 is a flow chart showing in detail an AF operation included in the main operation shown in FIG. 11.

At a step 100 of FIG. 12, the flag AFOK is set at "0". The flag AFOK is arranged to indicate the result of focus adjustment (focusing). The flag AFOK is at "1" when an in-focus state is attained and at "0" either when the focus adjustment is inadequate or when the switch SW1 turns off with a finger of the operator detached from the shutter release button 14. As described above, the flow of the main operation of the camera is executed according to the state of the flag AFOK.

At a step 101, one of focus detecting areas is selected. The focus detecting area is selected with a subroutine which will be described in detail later with reference to FIG. 13. As will be described later, the camera is arranged to let the operator know that a focus detecting area is selected according to information on the visual line of the operator by flickering a distance measuring mark within the visual field of the viewfinder. This arrangement enables the operator to know whether a focus detecting area is selected as desired.

At a step 102, after the display of the selected focus detecting area is confirmed by the operator, a check is made again for the state of the switch SW1 to find if the switch SW1 continues to be pushed. In other words, this step is provided because the finger of the operator will be detached from the shutter release button 14 to turn off the switch SW1 if the focus detecting area selected is in a position not apposite to the object to be photographed, while the shutter release button 14 will be continuously pushed by the finger if the focus detecting area selected is in a position apposite to the object.

If the switch SW1 is found at the step 102 to be not in its on-state, thus indicating that the finger of the operator is detached from the shutter release button 14 to turn off the switch SW1, the subroutine comes to an end. However, if the switch SW1 is found to continue to be kept in its on-state after the display of the focus detecting area selected is confirmed by the operator, the flow proceeds to a step 103.

At the step 103, focus detection is carried out to detect the focused state of at least one of the focus detecting areas selected. More specifically, a signal is sent from the microcomputer PRS to the AF sensor driving device SDR to cause the AF sensor driving device SDR to drive the AF area sensor device SNS, so that the A/D converted values of outputs of line sensor pairs for at least one focus detecting area selected are obtained. The focus state of the selected focus detecting area is detected through a predetermined computing process on the converted value.

At a step 104, a check is made to find if the focus state of the selected focus detecting area is in focus. If not, the flow proceeds to a step 105 to execute a focus adjusting process. If so, the flow proceeds to a step 106 without making focus adjustment.

At the step 105, the focus adjusting process is executed as follows. The microcomputer PRS sends a signal to the photo-taking lens unit LNS mounted on the camera through the lens communication buffer circuit LCOM for driving the photo-taking lens unit LNS. The lens driving signal is inputted to the control circuit LPRS disposed within the lens unit LNS. Then, the control circuit LPRS of the lens unit LNS causes the focusing motor LMTR to be driven according to the content of the signal from the microcomputer PRS. The focusing motor LMTR then moves the focusing (focus adjusting) optical system in the optical axis direction to make focus adjustment accordingly.

At a step 106, after driving the focusing optical system, a check is made again for the state of the switch SW1 to find if the finger of the operator has been detached from the shutter release button 14. If the switch SW1 is found to be in its on-state, thus indicating that the finger of the operator has not been detached from the shutter release button 14, the flow proceeds to the next step 107. At the step 107, the focus detecting action is performed again. If the focus detecting area is found not in focus, the photo-taking lens unit LNS is driven to make focus adjustment once again.

At a step 108, a check is made to find if the focus of the photo-taking lens unit LNS has been adjusted to an in-focus state for the selected focus detecting area. If so, the flow proceeds to a step 109. At the step 109, the microcomputer PRS sets the flag AFOK at "1" and, at the same time, sends a signal to the switch-detecting-and-display-driving circuit DDR to cause the circuit DDR to light up the in-focus mark FAF of the display FDSP within the viewfinder. With the in-focus mark FAF lighted up, the operator is informed that an in-focus state is attained.

Further, if the photo-taking lens unit LNS is found at the step 108 to be not in focus, that is, if an adequate focus adjustment is found to be impossible, the flow proceeds to a step 110. At the step 110, the microcomputer PRS sends a signal to the switch-detecting-and-display-driving circuit DDR to cause the switch-detecting-and-display-driving circuit DDR to flicker the in-focus mark FAF of the display FDSP within the viewfinder. The flicker of the in-focus mark FAF warns the operator of the inadequateness (or impossibility) of focus adjustment. At the next step 111, a check is made for the state of the switch SW1. If the switch SW1 is found to be in its on-state, i.e., while the shutter release button 14 is being pushed by the operator, the inadequate state of focus adjustment is continuously displayed. When the finger of the operator is detached from the shutter release button 14 to turn off the switch SW1, the AF subroutine comes to an end.

The AF subroutine is executed in the manner as described above.

A "focus-detecting-area-selecting" operation in the embodiment is next described with reference to the flow chart of FIG. 13, as follows.

The dial 30 which is disposed on the surface of the back cover of the camera is provided for selection of a focus detecting area. The terminal (or signal) DREQ2 is arranged to be at a high level when the dial 30 is operated to rotate. Therefore, a focus detecting area selecting subroutine in the embodiment begins with making a check for the state of the terminal (signal) DREQ2 at a step 201 of FIG. 13. At the step 201, if the terminal DREQ2 is found to be at a low level, this state indicates that the dial 30 is not turned, i.e., no focus detecting area selecting operation is newly performed. Then, this subroutine comes to an end.

In that case, the focus detecting area for which focus is to be adjusted is a focus detecting area which has been selected last time.

If the terminal DREQ2 is found to be at a high level indicating that a focus detecting area selecting operation has been performed, on the other hand, the flow proceeds to a step 202. At the step 202, a check is made to find if the switch SW1 is in its on-state. If so, the flow proceeds to a step 203 to set a variable STEP at "1". The variable STEP is a value to be used for multiplying thereby dial data DIALR which will be described later.

At the next step 204, a "DIAL2 communication" subroutine is carried out. The details of this subroutine will be described later.

If the switch SW1 is found at the step 202 to be not in its on-state, the flow proceeds to a step 209. At the step 209, the variable STEP is set at "5". At the next step 210, the "DIAL2 communication" subroutine is carried out. Then, the flow proceeds to a step 205.

At the step 205, a computing operation shown in the flow chart is carried out using the dial data DIALR which is obtained by the "DIAL2 communication" subroutine, the focus detecting area position data AFPR which indicates the currently set focus detecting area position and the above-stated coefficient variable STEP. The dial data DIALR has a polarity. The dial data DIALR is positive when the dial 30 is rotated clockwise and is negative when the dial 30 is rotated counterclockwise.

At a step 206, a check is made to find if the focus detecting area position data AFPR obtained through the above-stated computing operation is larger than "0". If not, the flow proceeds to a step 212 to carry out a computing operation as shown in the flow chart. After the step 212, the flow returns to the step 206 to compare the data AFPR with "0" once again. If the data AFPR is found to have become larger than "0", the flow proceeds to a step 207. At the step 207, the focus detecting area position data AFPR obtained by the computing operation is compared with a variable AFPMAX to find if the focus detecting area position data AFPR is larger than the variable AFPMAX. If so, the flow proceeds to a step 208 to carry out a computing operation as shown in the flow chart. After the computing operation, flow returns to the step 207 to make the same comparison.

The variable AFPMAX represents the number of selectable focus detecting areas, that is, a maximum value of the focus detecting area position data. Further, the focus detecting area position data AFPR indicates the position of the focus detecting area AFPNT and, according to the position of the focus detecting area AFPNT, takes a value which serially indicates the right-hand side area when the leftmost side area is denoted by the value "1".

At the steps 206, 207 and 208, if the focus detecting area position data AFPR becomes larger than the maximum value AFPMAX as a result of a process of a step 213 when the focus detecting area selected last time by the dial operation or the like is located at one end or near to the end of a plurality of focus detecting areas which constitute the focus detectable range AFARA shown in FIG. 9, a process is executed in such a way as to bring the position to the other end and then to shift the position as much as the extent to which the maximum value AFPMAX is surpassed by the process of the step 213. Further, at the step 213, the focus detecting area AFPNT corresponding to the focus detecting area position data AFPR is brought into a lit-up state.

The focus detecting area selecting operation of the camera is carried out by the above-stated steps from 201 through 213. The dial 30 which is disposed on the surface of the back cover is an operation member provided for selecting the focus detecting area. When the dial 30 is operated to rotate while the switch SW1 is in its on state, the selecting position of the focus detecting area serially shifts one by one. If the dial 30 is rotated while the switch SW1 is in its off-state, the selecting position of the focus detecting area shifts at intervals of five areas.

FIGS. 14(A) and 14(B) are flow charts showing respectively the details of "DIAL1 communication" and "DIAL2 communication" subroutines. The subroutine for the "DIAL2 communication" mentioned in the foregoing is first described below with reference to FIG. 14(B).

At a step 1210, a check is made for the state of the signal (terminal) DREQ2 outputted by the information input device DIAL2 to find if any information is input by rotating the dial 30 which is provided on the surface of the back cover.

If the dial 30 is in process of being rotated, the dial switches SWDIAL21 and SWDIAL22 alternately repeat turning on and off. Then, the counter DIALCNT counts the switch actions and a count value is output from the terminal group CNTOUT.

If any of the terminals CNTOUT of the counter DIALCNT is at a high level thus showing its counting action, the OR gate GOR1 outputs the signal DREQ2 at a high level. If the signal DREQ2 is not at a high level, the dial 30 is not operated. Then, since no digital information is inputted, the subroutine comes to an end.

If the signal DREQ2 is at a high level, the flow proceeds to a step 1220. At the step 1220, the terminal CSDI2 is set at a high level for a serial communication with the information input device DIAL2. At a step 1230, with the terminal CSDI2 at a high level, the information input device DIAL2 is thus selected as a corresponding part for the serial communication. The microcomputer PRS then outputs a communication synchronizing clock signal SCLK. A data signal SI is sent out to supply data from the information input device DIAL2 to the microcomputer PRS.

At a step 1240, the terminal CSDI2 is set back to a low level after completion of the communication. At a step 1250, the terminal DRES2 is set at a high level and, after the lapse of a predetermined period of time, is again set back to a low level. At a step 1260, the data obtained by communication with the information input device DIAL2 is subjected to a computing process to obtain the number RCOUNT of rotation clicks of the dial 30 and the rotating direction DDIR of the dial 30. The subroutine then comes to an end.

The display of selecting positions of focus detecting areas and how the display vary in selecting the focus detecting area are next described with reference to FIGS. 15(A) to 15(F), FIGS. 16(A) to 16(F) and FIGS. 17(A) to 17(F). In these figures, gradations representing the focus detectable range AFARA shown in FIG. 9 are used for the purpose of clearly showing shifting positions.

The focus detectable range AFARA is composed of L focus detecting areas. Each of the focus detecting areas is arranged to be illuminated with the light of the LED by a known superimposing function. A focus detecting area AFPNT is thus illuminated immediately after the switch SW1 turns on or immediately after the focus detecting area is selected for a short period of time just long enough to be perceivable by the operator.

The changes taking place when the dial 30 is turned clockwise are first described with reference to FIGS. 16(A) to 16(F) as follows.

FIGS. 16(A) to 16(F) show how the position of the focus detecting area changes from one area over to another when the dial 30 which is disposed on the surface of the back cover is turned clockwise by a thumb or the like after the release button 14 is once pushed with an index finger or the like to its first stroke position to turn on the switch SW1. When the switch SW1 is turned on, illumination for the focus detecting area AFPNT is lit up.

Figure 16:
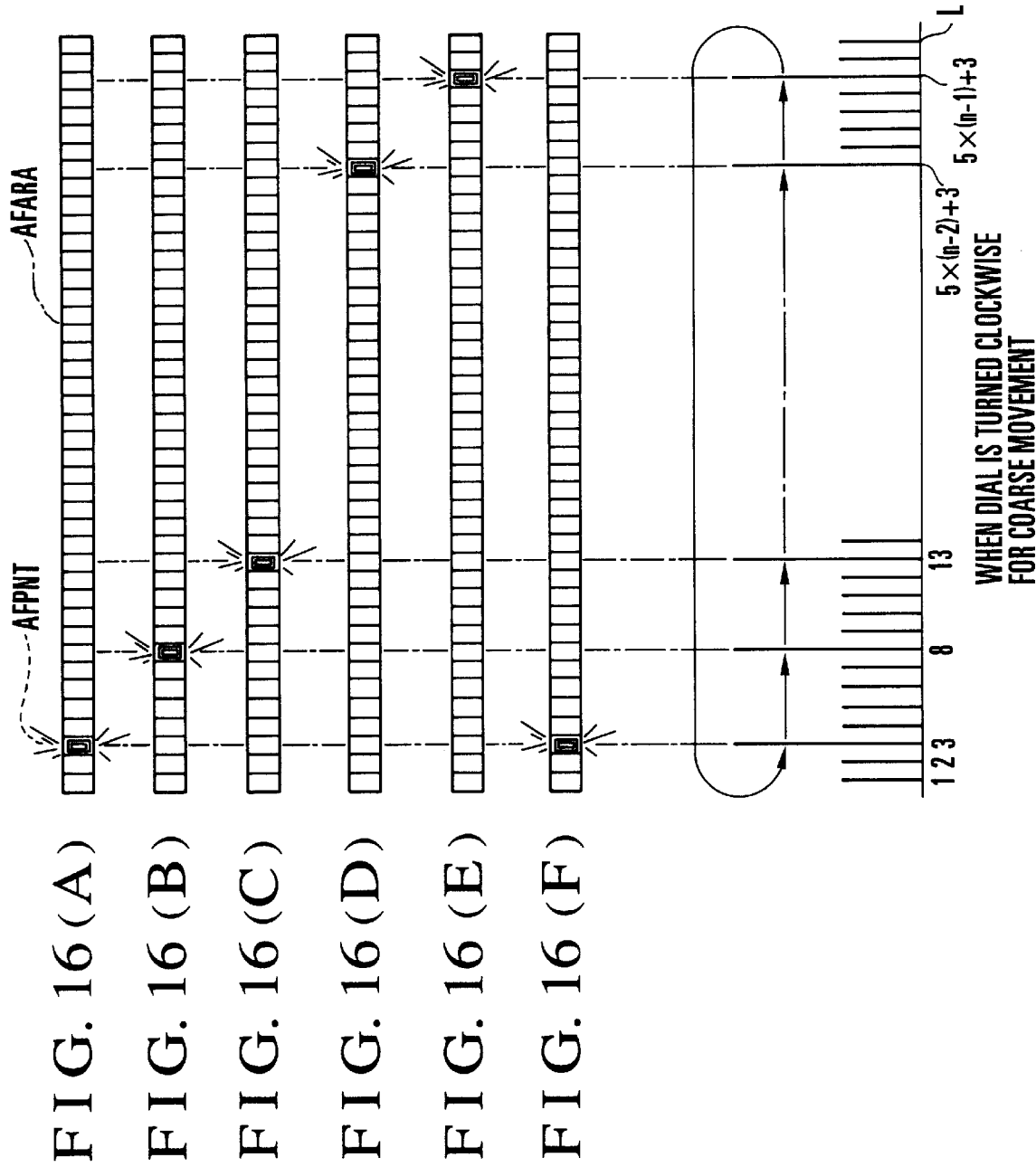
FIGS. 16(A) to 16(F) show in a chart another example of the focus detecting area selecting operation in the first embodiment of the invention.

In the case of FIG. 16(A), the focus detecting area AFPNT is located in the third position counting from the left end of the illustration. Next, the finger of the operator is detached from the shutter release 14 button to turn off the switch SW1. When the dial 30 is next turned clockwise to the extent of another click, the focus detecting area AFPNT shifts to the eighth focus detecting position counting from the left end and the illumination of this focus detecting position lights up to show this change while that of the third focus detecting position is put out, as shown in FIG. 16(B). If the dial 30 is turned further clockwise to the extent of a further click, the focus detecting area AFPNT shifts to the 13th focus detecting position and the illumination of this position lights up, as shown in FIG. 16(C).

When the turning operation on the dial 30 is repeated in this manner to the extent of a total of n clicks, the focus detecting area AFPNT comes to the $(5 \cdot (n-2)+3)$-th focus detecting position, as shown in FIG. 16(D). If the dial 30 is turned further to the extent of n+1 clicks, the focus detecting area AFPNT comes to a (5·(n−1)+3)-th focus detecting position, as shown in FIG. 16(E). When the dial 30 is turned still further to the extent of one more click, the focus detecting area AFPNT comes back to the third focus detecting position, overriding a right end focus detecting position L, as shown in FIG. 16(F).

The arrangement described above enables the operator to confirm the focus detecting area by pushing the shutter release button halfway to cause the switch SW1 to turn on. The arrangement further enables the operator to coarsely select the focus detecting area, after turning off the switch SW1, by turning the dial 30, disposed on the surface of the back cover, to cause the focus detecting area AFPNT to shift from one focus detecting position to another at intervals of five positions every time the dial 30 is turned by one click. During this coarse focus detecting area selecting operation, the shift of the focus detecting area position comes back to the left end position after it reaches the right end position. In a case where the dial 30 is turned counterclockwise the shift takes place in the reverse direction from the right end toward the left end and the focus detecting area can be selected coarsely in the same manner as mentioned above.

FIGS. 15(A) to 15(F) show a fine focus detecting area selecting operation.

Referring to FIGS. 15(A) to 15(F), when the switch SW1 turns on with the shutter release button 14 pushed halfway by an index finger or the like to its first stroke position, the illumination of the focus detecting area AFPNT is lit up.

Figure 15:
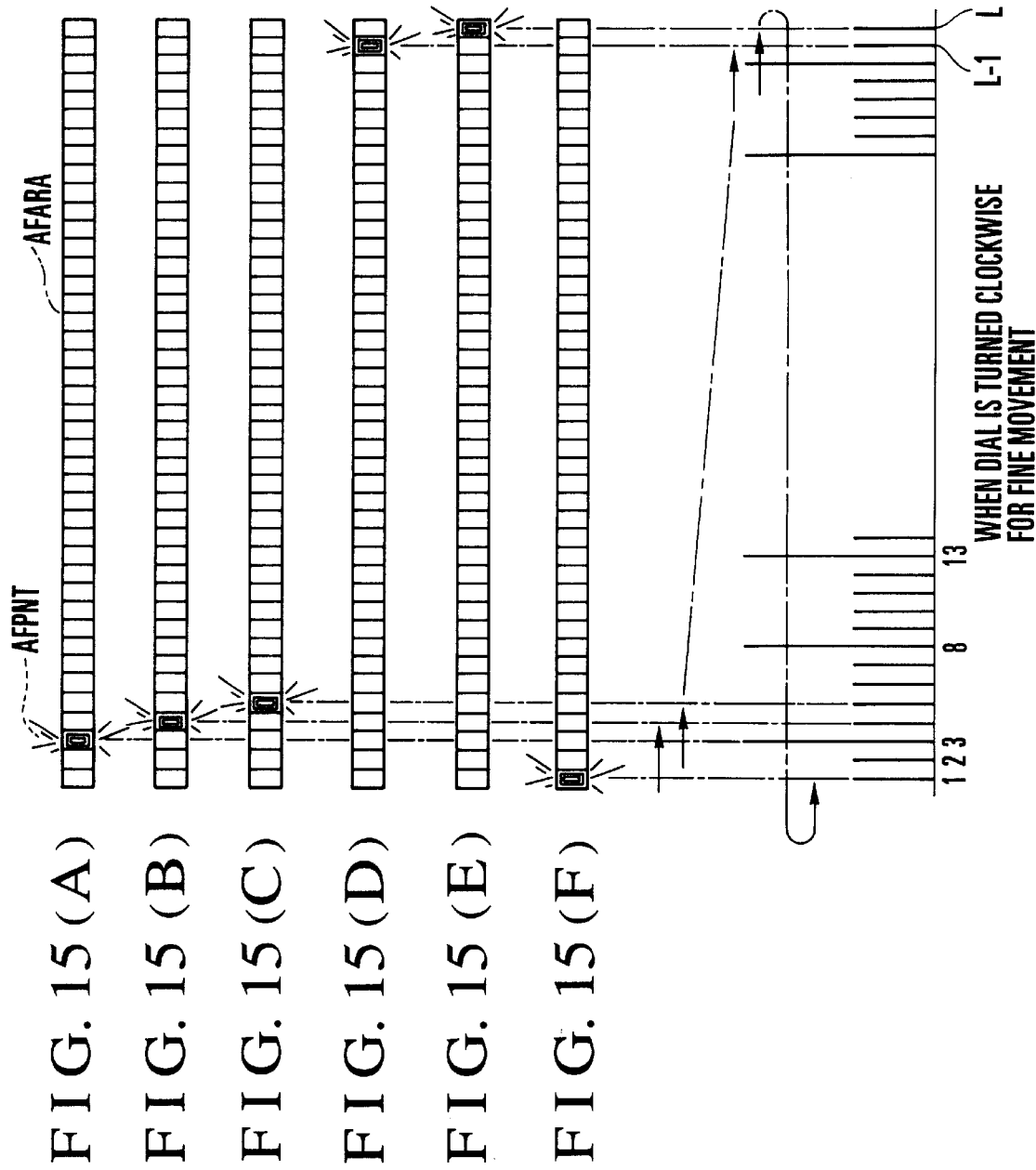
FIGS. 15(A) to 15(F) show in a chart one example of a focus detecting area selecting operation in the first embodiment of the invention.

In FIG. 15(A), the focus detecting area AFPNT is located in the third position counting from the left end of the illustration. After the illumination of the focus detecting area AFPNT is lighted up, when the dial 30 is turned clockwise to the extent of one click while the switch SW1 is kept turned on, the focus detecting area AFPNT shifts to the fourth focus detecting area position counting from the left end. Then, the illumination of the fourth focus detecting area position is lighted up and that of the third focus detecting area position is put out to indicate this change, as shown in FIG. 15(B). When the dial 30 is turned to the extent of another click, the focus detecting area AFPNT shifts to the fifth focus detecting area position and the illumination of the fifth focus detecting area position is lighted up to show the change while that of the fourth focus detecting position is put out, as shown in FIG. 15(C).

When the turning operation on the dial 30 is repeated in this manner, the focus detecting area AFPNT shifts to adjoining focus detecting positions one by one including a position L−1 shown in FIG. 15(D) to a position L shown in FIG. 15(E). When the dial 30 is turned still further to the extent of one more click, the focus detecting area AFPNT comes back to the first focus detecting position 1, as shown in FIG. 15(F).

The arrangement described above enables the operator to finely select focus detecting areas by turning the dial 30 disposed on the surface of the back cover to cause the focus detecting position to change one by one every time the dial 30 is turned to the extent of one click, while the switch SW1 is left in its on-state after the shutter release button 14 is pushed halfway by the operator. During this fine focus detecting area selecting operation, the shift of the focus detecting area position comes back to the left end position after it reaches the right end position to further permit the fine focus detecting area selecting operation. In a case where the dial 30 is turned counterclockwise the shift takes place in the reverse direction from the right end toward the left end and the focus detecting area can be selected finely in the same manner as mentioned above.

FIGS. 17(A) to 17(F) show a combination of the above-stated coarse and fine selecting operations on the focus detecting area positions.

Figure 17:
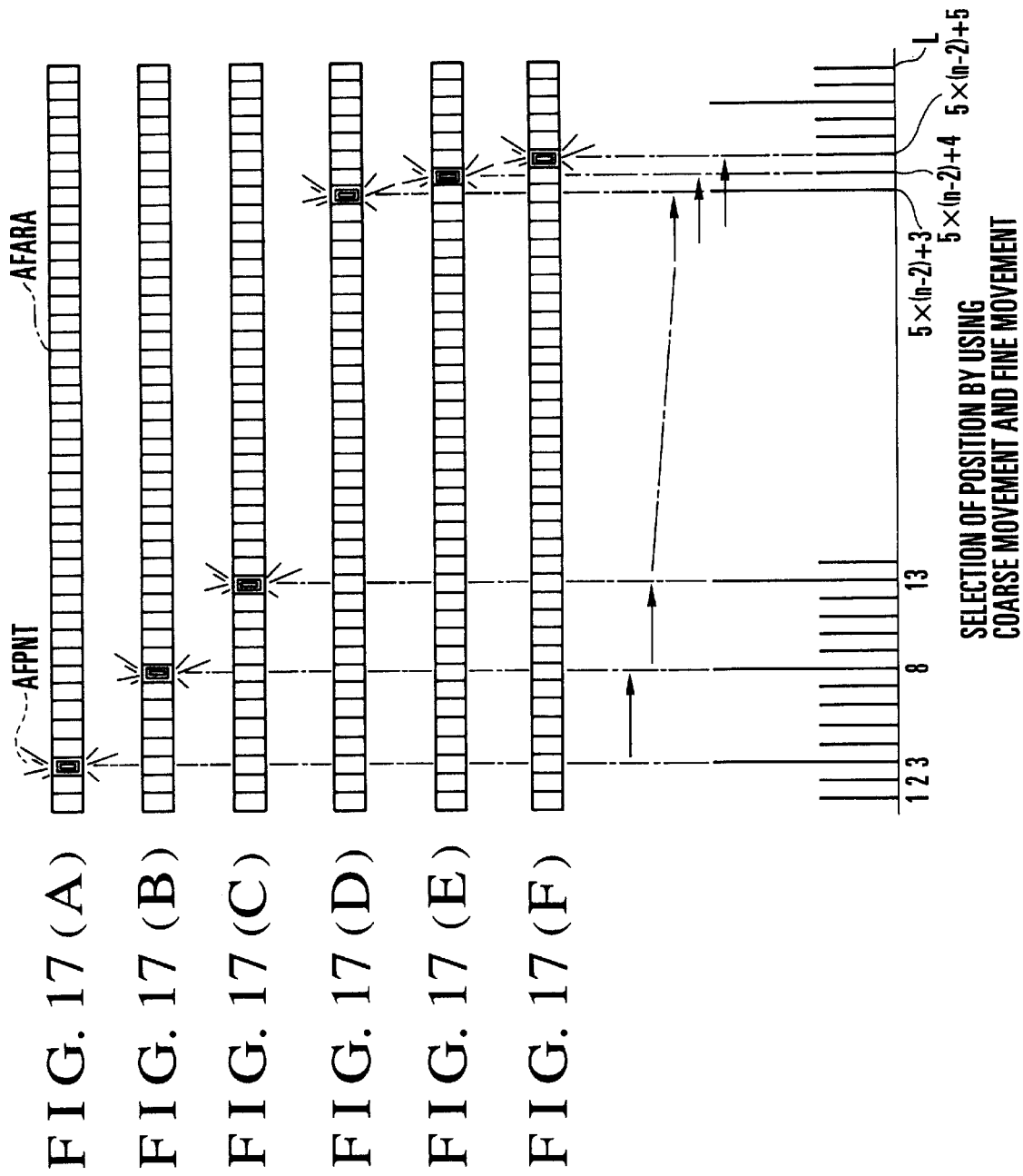
FIGS. 17(A) to 17(F) show in a chart a case where the focus detecting area selecting operation of FIGS. 15(A) to 15(F) and that of FIGS. 16(A) to 16(F) are carried out in combination with each other.

When the release button 14 is pushed with an index finger or the like to its first stroke position to turn on the switch SW1, illumination for a focus detecting area AFPNT is lit up. In the case of FIG. 17(A), the focus detecting area AFPNT is located in the third focus detecting area position counting from the left end.

When the dial 30 is turned clockwise to the extent of one click after the switch SW1 is turned off by detaching a finger from the shutter release button 14, the focus detecting area AFPNT shifts to the eighth focus detecting position counting from the left end and the illumination of this focus detecting position is lit up to show this change while that of the third focus detecting position is put out, as shown in FIG. 17(B). When the dial 30 is turned further clockwise to the extent of another click, the focus detecting area AFPNT shifts to the 13th focus detecting position and the illumination of this position lights up, as shown in FIG. 17(C). With this process repeated, when the dial 30 is turned to the extent of a total of n clicks, the focus detecting area AFPNT comes to a (5·(n−2)+3)-th focus detecting position, as shown in FIG. 17(D).

After that, when the switch SW1 is again turned on by pushing the shutter release button 14 to the first stroke position and the dial 30 is turned clockwise to the extent of a further one click, the focus detecting area AFPNT shifts to a (5·(n−2)+4)-th focus detecting position located next on the right side, as shown in FIG. 17(E). The illumination of this position is lighted up and that of the (5·(n−2)+3)-th focus detecting position is put out.

When the dial 30 is turned clockwise to the extent of still further one click, the focus detecting area AFPNT shifts to a (5·(n−2)+5)-th focus detecting position, i.e., an (L−5)-th position, as shown in FIG. 15(F). Further, the selected area shifts reversely to the above-stated direction when the dial 30 is turned counterclockwise.

With the switch SW1 turned on or off as desired while watching the object through the viewfinder in the above-stated manner, the focus detecting area can be promptly selected by turning the dial 30 disposed on the surface of the back cover. Therefore, the focus of the camera can be appositely adjusted on the basis of information on focus detection without missing any shutter operating opportunity.

(Second Embodiment)

The first embodiment described above is arranged such that, in inputting information by the dial 30 which is disposed on the surface of the back cover of the camera, the amount of shift of the focus detecting area per unit of rotation of the dial 30 varies with the state of the switch SW1, i.e., according to whether the switch SW1 is in an on-state or in an off-state. In the case of the second embodiment, on the other hand, the information on the selection of the focus detecting area can be inputted by turning or rotating both the dial 15 which is disposed on the upper surface of the camera body and the dial 30 on the back cover of the camera arranged as shown in the block diagram of FIG. 5. The shifting amount of the focus detecting area per unit of rotation of the dial 15 and that of the dial 30 differ from each other.

In other words, both the dial 30 disposed on the surface of the back cover and the dial 15 disposed on the upper surface of the camera body 10 are each provided with a focus detecting area selecting function. However, the focus detecting area shifting amount per one click when the dial 30 is rotated differs from the focus detecting area shifting amount per one click when the dial 15 is rotated.

The details of the second embodiment are as follows.

In the case of the second embodiment, the focus detecting area selecting function is added to the functions of the dial 15 which is disposed on the upper surface of the camera body. More specifically, the focus detecting area can be selected not only by pushing the focus detecting area selection button 18 shown in FIG. 1 in combination with a turning operation on the dial 15 disposed on the upper surface of the camera body, but also by a turning operation on the dial 30. The shifting amount of the focus detecting area per one click of rotation of the dial 15 is set on the basis of data stored beforehand in an EEPROM which is disposed within the microcomputer PRS.

Figure 18:
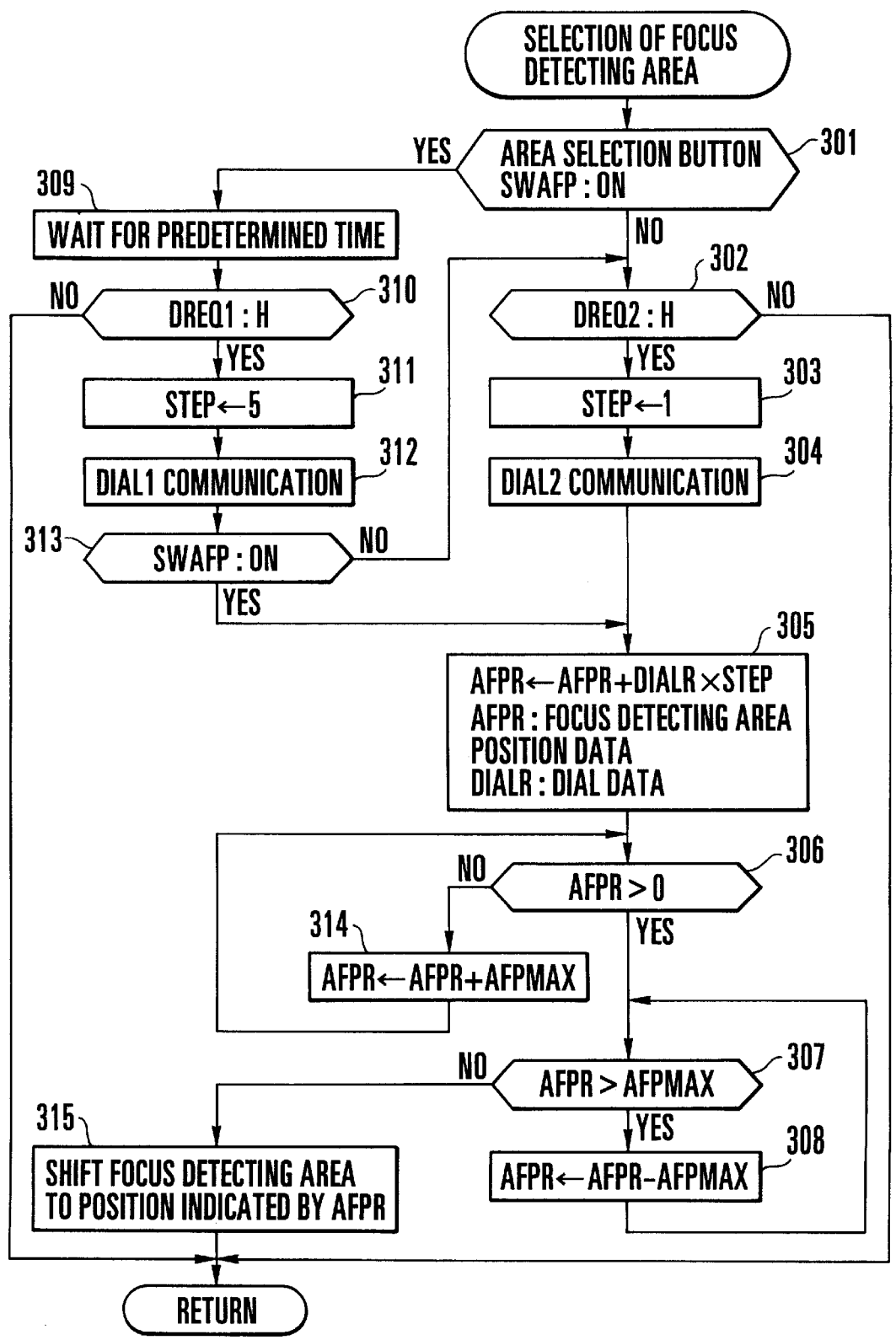
FIG. 18 is a flow chart showing a focus detecting area selecting operation of a camera arranged as a second embodiment of the invention.

FIG. 18 is a flow chart showing the above-stated feature of the second embodiment. A series of camera actions of the second embodiment can be carried out by replacing the flow of operation shown in FIG. 13 with a flow of operation shown in FIG. 18.

With the exception of what is shown in FIG. 18, the series of camera actions of the second embodiment are the same as those of the first embodiment described in the foregoing. Therefore, the focus detecting area selecting operation using the dial 30 and the dial 15 is described below with reference to FIG. 18.

At a step 301, a check is made for the state of the switch SWAFP. The switch SWAFP turns on when the focus detecting area selection button 13 shown in FIG. 1 is pushed in. If the switch SWAFP is found to be in its on-state, the flow proceeds to a step 309 to wait for the lapse of a predetermined period of time.

After the lapse of this period of time, the flow proceeds to a step 310. At the step 310, a check is made for a signal DREQ1, the level of which becomes high when the dial 15 disposed on the upper surface of the camera body is turned. If the signal DREQ1 is found not at a high level, the flow of operation returns to the AF subroutine.

If the signal DREQ1 is found to be at a high level, the flow proceeds to a step 311 to set a variable STEP at "5" and proceeds to a step 312. At the step 312, a "DIAL1 communication" subroutine is executed. This subroutine is the same as the "DIAL2 communication" in the first embodiment shown in FIG. 14(B) except that the communicating partner is, in this case, the information input device DIAL1 which is arranged to input an amount of turning operation on the dial 15 disposed on the upper surface of the camera body. Therefore, the details of this subroutine are omitted here.

At the next step 313, a check is made to find if the switch SWAFP is in an on-state. If not, the input information from the dial 15 is ignored and the flow proceeds to a step 302. If so, the flow proceeds to a step 305. At the step 305, the focus detecting area selecting process is carried on according to the input information. In other words, the focus detecting area selecting process is performed when the dial 15 disposed on the upper surface of the camera body is operated to rotate while the focus detecting area selection button 13 is kept in a state of being pushed.

More specifically, at the step 305, an operation according to a formula shown in the flow chart is carried out using the value of the variable STEP, the focus detecting area position data AFPR and the dial data DIALR. At the next step 306, a check is made to find if the focus detecting area position data AFPR obtained by the operation of the step 305 is larger than "0". If not, the flow proceeds to a step 314 to carry out a computing operation according to a formula shown at the step 314. The flow then returns to the step 306 to again compare the data AFPR with "0". If the data AFPR becomes larger than "0", the flow proceeds to a step 307. At the step 307, a check is made to find if the focus detecting area position data AFPR is larger than a variable AFPMAX. If so, the flow proceeds to a step 308. At the step 308, a computing operation is carried out according to a formula shown at the step 308. After that, the flow returns to the step 307 to make the same comparison again.

If, at the step 307, the focus detecting area position data AFPR is not larger than the variable AFPMAX, the flow proceeds to a step 315. At the step 315, which is similar to the step 213 in FIG. 13, the focus detecting area AFPNT corresponding to the focus detecting area position data AFPR is brought into a lit-up state.

At the steps 306, 307 and 308, if the focus detecting area position data AFPR becomes larger than the maximum value AFPMAX as a result of the process of the step 307 when the focus detecting area selected last time by the dial operation or the like is located at one end or near to the end of a plurality of focus detecting areas which constitute the focus detectable range AFARA shown in FIG. 9, a process is executed in such a way as to bring the focus detecting position to the other end and to shift it as much as the extent to which the maximum value AFPMAX is surpassed by the process of the step 307.

In a case where the switch SWAFP is found at the step 301 to be not in its on-state, the flow of operation proceeds to the step 302. At the step 302, a check is made to find if the signal DREQ2 is at a high level. The level of the signal DREQ2 becomes high when the dial 30 disposed on the surface of the back cover is operated to rotate in the same manner as in the case of the first embodiment. If the signal DREQ2 is not at a high level, the dial 30 is not operated, i.e., the focus detecting area selecting operation is not performed. The subroutine, therefore, comes to an end.

In that event, the focus detecting area to be used for focus adjustment thereafter is a focus detecting area selected by the last focus detecting area selecting operation.

If the signal DREQ2 is found at the step 301 to be at a high level, thus indicating that a focus detecting area selecting operation is being performed, the flow proceeds to a step 303. At the step 303, the variable STEP is set at "1" and the flow proceeds to a step 304 to carry out the "DIAL2 communication" subroutine in the same manner as already described in detail in the foregoing.

The focus detecting area selecting operation of the camera is thus executed at the steps 301 to 315 as described above. Both the dial 30 disposed on the surface of the back cover and the dial 15 disposed on the upper surface of the camera body have the focus detecting area selecting function.

The dial 15 is arranged as follows. When the dial 15 is operated to rotate while the switch SWAFP is kept in its on-state by pushing the focus detecting area selection button 13, the focus detecting area shifts from one position over to another at intervals of four positions. When the other dial 30 is operated to rotate, on the other hand, the focus detecting area serially changes its position one by one if the switch SWAFP is in an off-state. By referring to FIGS. 17(A) to 17(F), how the focus detecting area AFPNT located in the third focus detecting (area) position counting from the left end of the focus detectable range AFARA is shifted to a focus detecting position L–5 located near to the right end will be described.

The focus detecting area selection button 13 is first pushed in with a thumb to turn on the switch SWAFP. While the switch SWAFP is kept in its on-state, when the dial 15 is turned to the extent of one click clockwise, as viewed from behind the camera, with a middle finger or an index finger or the like, the focus detecting area AFPNT shifts from the third position in FIG. 17(A) to the eighth focus detecting position. The illumination of the new position is lighted up to show this shift while that of the third position is put out, as shown in FIG. 17(B). When the dial 15 is turned clockwise further to the extent of another click, the focus detecting area shifts to the 13th focus detecting position and the illumination of the 13th position is lighted up, as shown in FIG. 17(C). By repeating this process, when the dial 15 is turned to the extent of a total of n clicks, the focus detecting area is shifted to a (5·(n−2)+3)-th focus detecting position, as shown in FIG. 17(D).

If the thumb is detached from the focus detecting area selection button 13 to turn off the switch SWAFP, at this position, and the dial 30 (instead of the dial 15) is turned with the thumb clockwise to the extent of one click, the focus detecting area AFPNT shifts to a (5·(n−2)+4)-th focus detecting position which is located next on the right side and the illumination of the new focus detecting position is lit while the illumination of the (5·(n−2)+3)-th focus detecting position is put out, as shown in FIG. 17(E). When the dial 30 is turned further clockwise to the extent of one click, the focus detecting area AFPNT shifts to a (5·(n−2)+5)-th, i.e., (L−5)-th, focus detecting position located next on the right side, as shown in FIG. 17(F).

The second embodiment thus enables the operator to select the focus detecting area by using the dial 15 for coarse selection and the dial 30 for fine selection. Therefore, the most apposite detecting area thus can be promptly and accurately selected from among many focus detecting areas.

(Third Embodiment)

Figure 19:
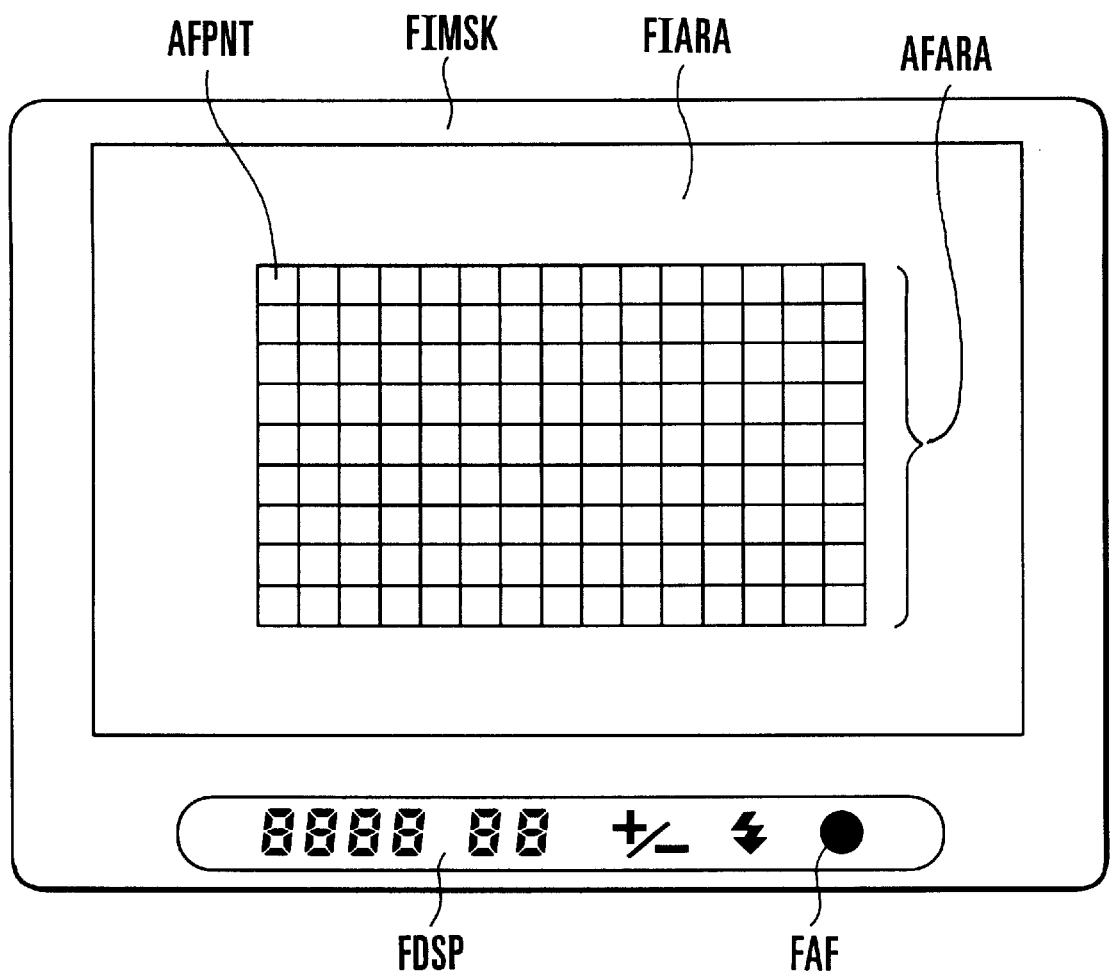
FIG. 19 shows focus detecting areas arranged inside the viewfinder of a camera according to a third embodiment of the invention.

The first and second embodiments described are arranged to select a focus detecting area from many focus detecting areas laterally aligned in one line in the visual field of the viewfinder. The third embodiment of the invention, on the other hand, applies to a case where a plurality of focus detecting areas are set in a two dimensional array as shown in FIG. 19. A focus detectable range of areas is assumed to be composed of L areas in the lateral direction of the array and K areas in the vertical direction of the array.

The third embodiment is described in detail as follows.

For selecting a focus detecting area from among the plurality of focus detecting areas arranged in a two dimensional array, the third embodiment is provided with a shifting direction change-over function to be carried out by means of a focus detecting area selection button in addition to the focus detecting area selecting function of the first embodiment described.

Figure 20:
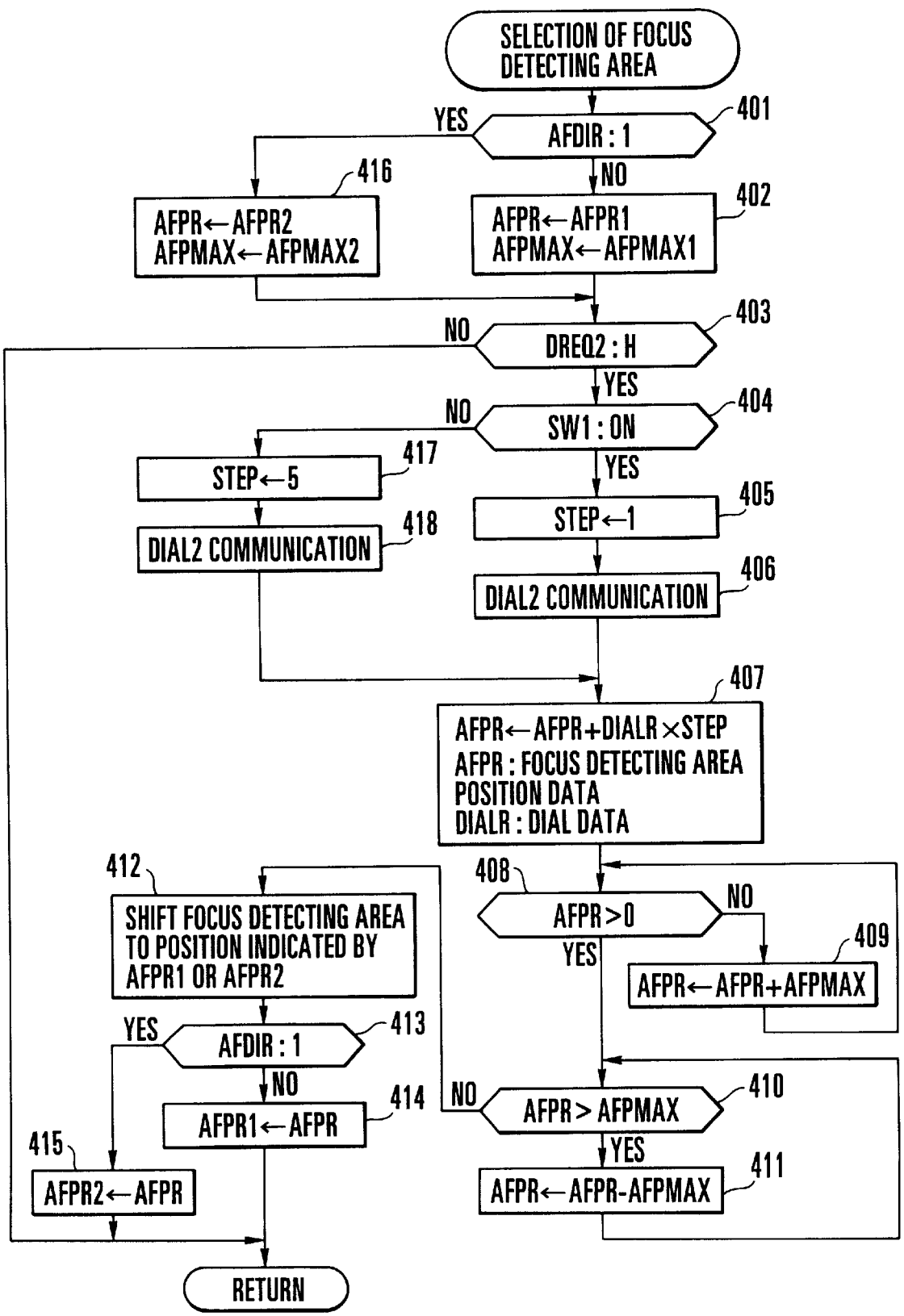
FIG. 20 shows in a flow chart a focus detecting area selecting operation of the camera in the third embodiment of the invention.

FIGS. 19 and 20 show the features of the third embodiment. In describing the series of camera actions to be carried out in the third embodiment, therefore, FIGS. 19 and 20 are used in place of FIGS. 9 and 13. The series of camera actions is the same as in the case of the first embodiment and requires no further description of them with the exception of what is shown in FIGS. 19 and 20. The following description is, therefore, limited to a focus detecting area selecting operation using the dial 30, the shutter release button 14 and the focus detecting area selection button 13. In FIG. 19, the same parts as those of FIG. 9 are indicated by the same reference symbols.

FIG. 19 shows a display to be seen by looking into the viewfinder. In FIG. 19, reference symbol AFARA denotes a focus detectable range within a photo-taking area FIARA. The focus detectable range AFARA is composed of many focus detecting areas which are arranged in a two dimensional array. Other parts indicated by reference symbols FIMSK, etc., in FIG. 19 are identical with the parts already described in the foregoing and are, therefore, omitted from the following description.

Referring to FIG. 20, the focus detecting area selecting operation of the third embodiment is described as follows. At a step 401, a check is made to find if a variable AFDIR is at "1". The variable AFDIR indicates the shifting direction of selection of the focus detecting area. The position of the focus detecting area shifts in the horizontal direction of the focus detectable range AFARA when the variable AFDIR is at "0" and in the vertical direction when the variable AFDIR is at "1". The value of the variable AFDIR is changed between "0" and "1" in a toggle manner every time the switch SWAFP is turned on by a pushing operation on the focus detecting area selection button 13 shown in FIG. 1. If the variable AFDIR is found to be not "1" at the step 401, the flow of operation proceeds to a step 402. At the step 402, the variable AFPR is set to "AFPR1" and the variable AFPMAX is set to "AFPMAX1". If the variable AFDIR is found to be "1" at the step 401, the flow proceeds to a step 416 to set the variable AFPR to "AFPR2" and the variable AFPMAX to "AFPMAX2".

The variable AFPR is focus detecting area position data which indicates the position of a focus detecting area selected. The variable AFPRMAX indicates a maximum value possible for the variable AFPR, i.e., a maximum value of data of positions of selectable focus detecting areas. Further, the variable AFPR1 indicates data of a focus detecting area position in the horizontal direction. The variable AFPR2 indicates data of a focus detecting area position in the vertical direction. The data AFPMAX1 indicates a maximum value of the data of the focus detecting area positions in the horizontal direction. The data AFPMAX2 indicates a maximum value of the data of the focus detecting area positions in the vertical direction. Since the focus detectable range in this case is composed of "K·L" focus detecting areas, the data AFPMAX1 is the value L and the data AFPMAX2 is the value K.

Figure 13:
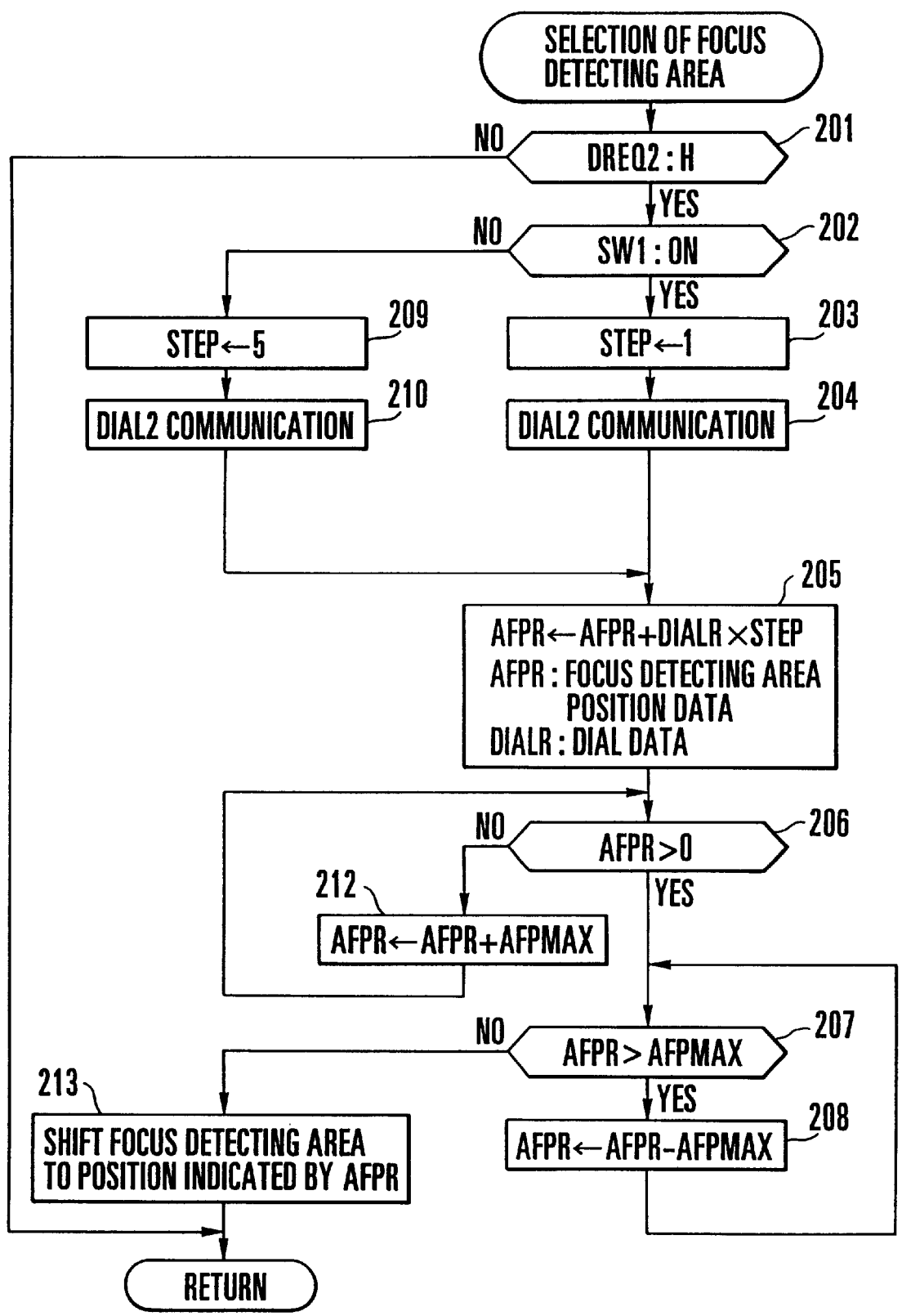
FIG. 13 is a flow chart showing in detail a focus detecting area selecting operation shown in FIG. 11.
Figure 14:
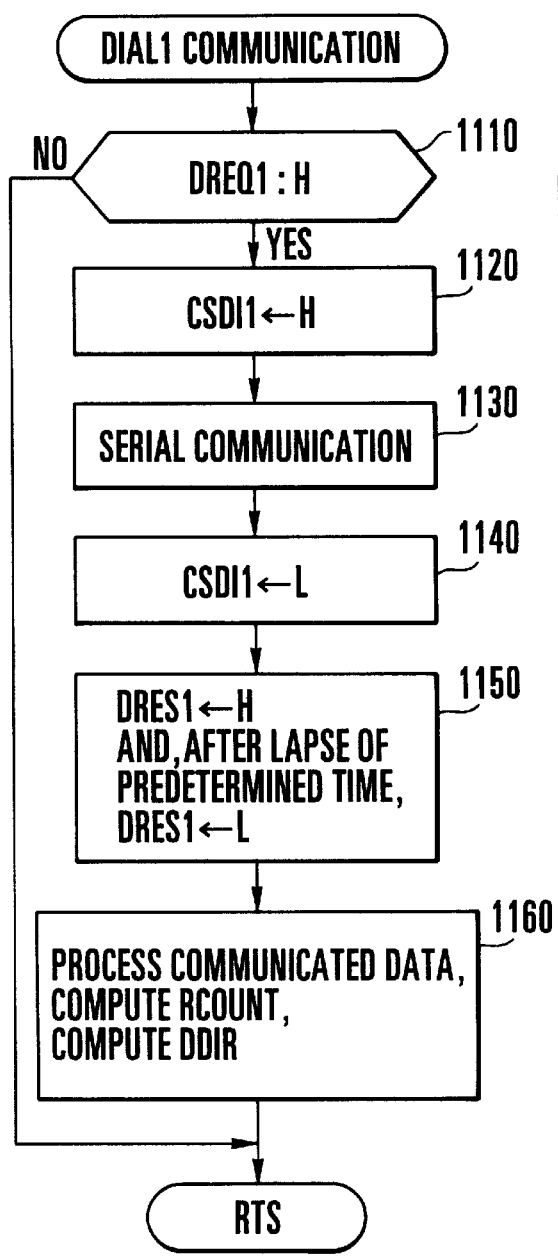
FIGS. 14(A) and 14(B) are flow charts showing operations of DIAL1 communication, respectively, and DIAL2 communication according to the first and second embodiments of the invention.
Figure 14:
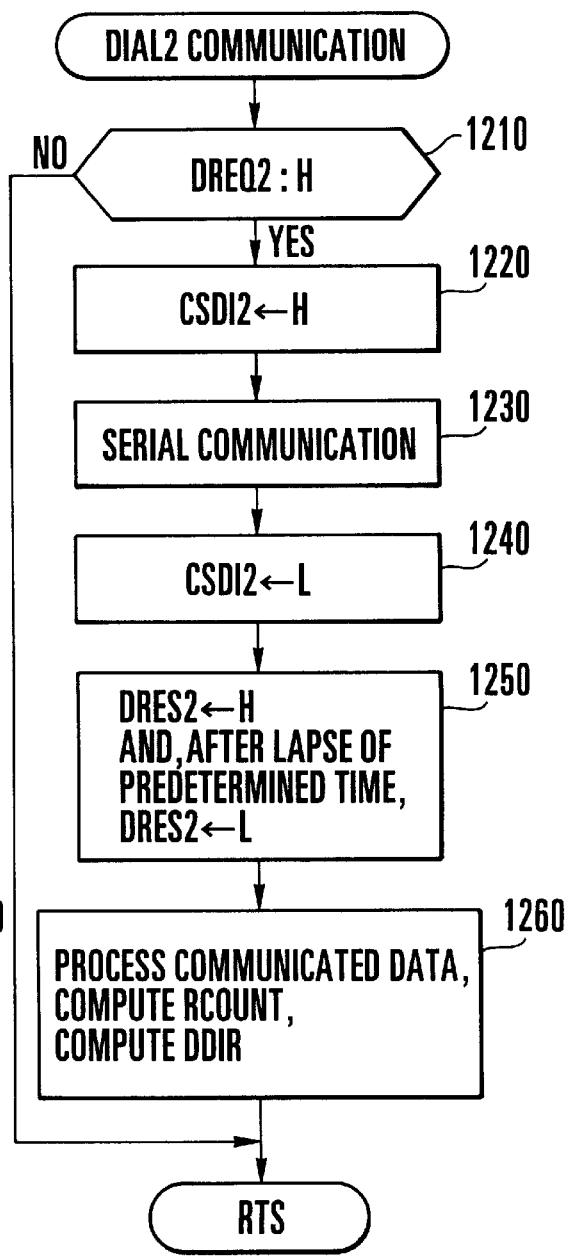

Steps 403 to 412 are identical with the steps 201 to 213 shown in FIG. 13 in the first embodiment described and, therefore, omitted from description here.

After the step 412, the flow proceeds to a step 413. At the step 413, again a check is made to find if the variable AFDIR is "1". If not, the flow proceeds to a step 414 to bring the focus detecting area position data AFPR back to the horizontal focus detecting area position data AFPR1. If so, the flow proceeds to a step 415 to bring the focus detecting area position data AFPR back to the vertical focus detecting area position data AFPR2. This subroutine then comes to an end.

The steps 401 to 415 constitute the focus detecting area selecting operation of the camera. While this operation is in process, no input from the switch SWAFP caused by the focus detecting area selection button 13 is accepted.

The shifting direction of the focus detecting area position is changed from one direction to the other in a toggle manner every time the focus detecting area selection button 13 is pushed to turn on the switch SWAFP.

When the dial 30 disposed on the surface of the back cover is turned while the switch SW1 is kept in its on-state with the shutter release button 14 pushed halfway, the position of the focus detecting area serially changes one by one from one position to another. However, when the dial 30 is turned while the switch SW1 is in its off-state with the finger of the operator detached from the shutter release button 14, the position of the focus detecting area coarsely shifts at intervals of five positions, i.e., at every five positions.

In a case where the focus detecting areas are two-dimensionally arrayed as shown in FIG. 19, the focus detecting area shifts in the same manner as in the case of the first embodiment in the horizontal direction of the array. In the vertical direction, the focus detecting area also shifts in the same manner as in the horizontal direction except that the total number of selectable positions changes from L in the lateral direction to K.

The invention is applicable not only to a single-lens reflex camera but also to a lens-shutter type camera, a video camera, an optical apparatus other than a camera and some other apparatus as long as they are arranged to have digital information inputs.

Each of the embodiments disclosed is arranged by way of example to permit selection of a focus detecting area by turning a dial. However, in accordance with the invention, the operation member to be used for selecting a focus detecting area is not limited to the dial but may be any other operation member such as a push button.

Further, while the embodiments of the invention have been described in the foregoing in respect of a focus detecting area selecting arrangement, the invention is likewise applicable, for example, to a case where a light measuring area must be quickly selected as desired from among a plurality of light measuring areas

I claim:

1. A focus detecting device having a plurality of focus detecting areas and detecting a focusing state of each of the focus detecting areas, said device comprising:

an operation member for selecting a focus detecting area;

a designation circuit for designating a desired area from among the focus detecting areas according to operation of said operation member, said designation circuit comprising a shift amount circuit and a shifting circuit, said shift amount circuit having as a shift amount a first value and a second value larger than the first value, and said shifting circuit having a first mode to designate focus detecting areas displaced by the first value in response to the operation of said operation member, and a second mode to designate focus detecting areas displaced by the second value in response to the operation of said operation member; and a selection circuit for controlling said shifting circuit by selecting the first and second modes.

2. A device according to claim 1, wherein the first value of the shift amount is equal to the shift of one focus detection area.

3. A device according to claim 1, wherein the plurality of focus detecting areas are disposed in positions separated from each other.

4. A device according to claim 1, further comprising a release operation member for controlling said selection circuit, and wherein said selection circuit selects the first mode when said operation member is operated while said release operation member is being operated, and selects the second mode when said operation member is operated while said release member is not operated.

5. A focus detecting device having a plurality of focus detecting areas and detecting a focusing state of each of the focus detecting areas, said device comprising:

a first operation member for selecting a focus detection area in one direction;

a second operation member for selecting a focus detection area in a second direction different from the direction of said first operation member;

a designation circuit for designating a desired area from among the focus detecting areas according to an operation of one of said first operation member and said second operation member, said designation circuit comprising a shift amount circuit and a shifting circuit, said shift amount circuit having as a shift amount a first value and a second value larger than the first value, said shifting circuit having a first mode to designate focus detecting areas displaced by the first value in response to the operation of said first operation member, and a second mode to designate focus detecting areas displaced by the second value in response to the operation of said second operation member; and a selection circuit for controlling said shifting circuit by selecting the first and second modes.

6. A device according to claim 5, wherein the first value of the shift amount is equal to the shift of one focus detecting area.

7. A device according to claim 6, further comprising a third operation member for causing said selection circuit to select one of the first mode and the second mode.

8. A device according to claim 1, wherein the plurality of focus detecting areas are two-dimensionally arrayed in vertical and horizontal directions, and said designation circuit comprises a setting member for setting the direction of the area to be designated in one of the vertical direction and the horizontal direction.

* * * * *

UNITED STATES PATENT AND TRADEMARK OFFICE
CERTIFICATE OF CORRECTION

PATENT NO. : 5,950,022

DATED : September 7, 1999

INVENTOR(S) : Shinichi HAGIWARA

It is certified that error appears in the above-identified patent and that said Letters Patent is hereby corrected as shown below:

COLUMN 4:

```
   Line 51, "communication, respectively," should read
--communication--.
   Line 52, "communication" should read
--communication, respectively,--.
```

COLUMN 5:

```
   Line 45, "supper" should read --upper--.
```

UNITED STATES PATENT AND TRADEMARK OFFICE
CERTIFICATE OF CORRECTION

PATENT NO.   :  5,950,022

DATED        :  September 7, 1999

INVENTOR(S)  :  Shinichi HAGIWARA

It is certified that error appears in the above-identified patent and that said Letters Patent is hereby corrected as shown below:

COLUMN 6:

Line 42, "cover 30." should read --cover 20.--.

COLUMN 16:

Line 32, "14(a)" should read --14(A)--.

COLUMN 24:

Line 36, "15(F)" should read --17(F)--.

UNITED STATES PATENT AND TRADEMARK OFFICE
CERTIFICATE OF CORRECTION

PATENT NO.   :   5,950,022

DATED        :   September 7, 1999

INVENTOR(S)  :   Shinichi HAGIWARA

It is certified that error appears in the above-identified patent and that said Letters Patent is hereby corrected as shown below:

COLUMN 30:

Line 11, "member for selecting a focus detection" should read --member;--.
Line 12, "area in one direction;" should be deleted.
Line 13, "member for selecting a focus detection" should read --member;--.
Lines 15-16, "area in a second direction different from the direction of said first operation member;" should be deleted.

Signed and Sealed this

Thirty-first Day of October, 2000

Attest:

Q. TODD DICKINSON

Attesting Officer          Director of Patents and Trademarks